United States Patent [19]

Croce et al.

[11] Patent Number: 4,771,630

[45] Date of Patent: Sep. 20, 1988

[54] METHOD AND APPARATUS FOR TESTING HERMETIC SEAL INTEGRITY OF SEALED PACKAGES AND CONTAINERS

[75] Inventors: Carlo P. Croce, Leonia; Sami A. Halaby, Kinnelon, both of N.J.; Arthur R. Oefinger, Stratford, Conn.

[73] Assignee: Warner-Lambert Company, Morris Plains, N.J.

[21] Appl. No.: 10,097

[22] Filed: Feb. 2, 1987

Related U.S. Application Data

[63] Continuation-in-part of Ser. No. 811,868, Dec. 20, 1985, Pat. No. 4,663,964.

[51] Int. Cl.[4] .............................................. G01M 3/36
[52] U.S. Cl. .......................................... 73/49.3; 73/52
[58] Field of Search .................................. 73/49.3, 52

[56] References Cited

U.S. PATENT DOCUMENTS 3,837,215 9/1974 Massage ........................ 73/49.3 X

FOREIGN PATENT DOCUMENTS

| 2351400 | 5/1976 | France ........................ 73/49.3 |
| 127438 | 7/1985 | Japan ......................... 73/49.3 |
| 202342 | 10/1985 | Japan ......................... 73/49.3 |
| 2059381 | 4/1981 | United Kingdom ................. 73/49.3 |

Primary Examiner—Michael J. Tokar
Assistant Examiner—Joseph W. Roskos
Attorney, Agent, or Firm—Charles A. Gaglia, Jr.; Henry C. Jeanette; Gary M. Nath

[57] ABSTRACT

Method and apparatus for testing hermetic seal integrity of sealed packages and containers, are provided. The method includes placing a sealed test package having at least one semi-flexible surface, within a test chamber. The pressure within the test chamber is changed from a first value to a second value, over the time interval of a test cycle. During the time interval of the test cycle, both the pressure within the test chamber and the displacement of the semi-flexible surface of the test package are continuously measured, and produced therefrom, are a first analog data signal proportional to the pressure within the test chamber, and a second analog data signal proportional to the displacement of the semi-flexible surface of the test package. During the time interval of the test cycle, the first analog data signal is converted into a first discrete data sequence, and the second analog data signal is converted into a second discrete data sequence. From the first discrete data sequence and the second discrete data sequence, a correlation estimate is computed in accordance with principles of statistical analysis, as to provide a reliable measure of hermetic seal integrity of the test package.

38 Claims, 9 Drawing Sheets

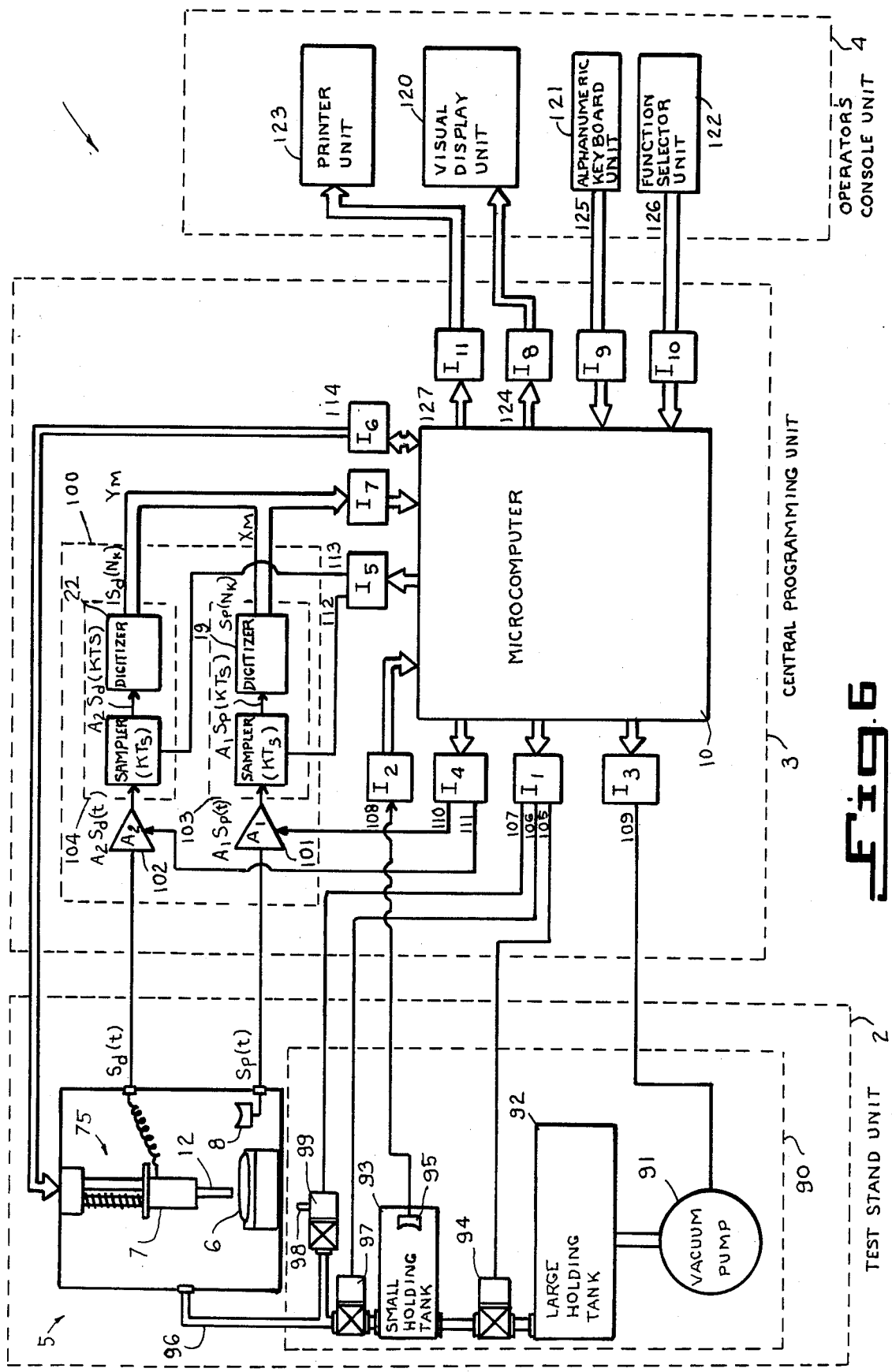

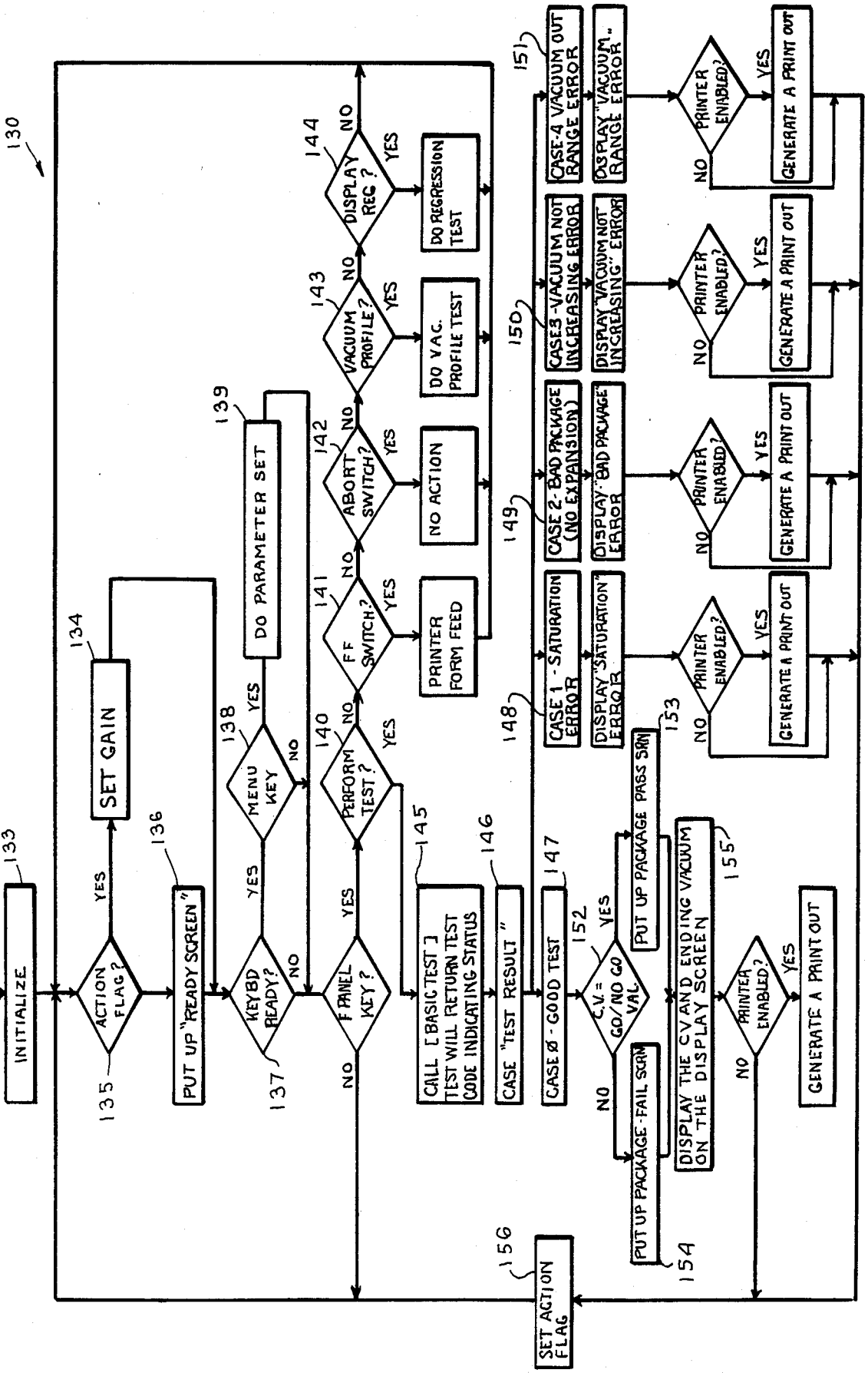

LINEAR REGRESSION FUNCTIONS COMPUTED
OVER ENTIRE INTERVAL OF SAMPLED
VACUUM PRESSURE DATA

LINEAR REGRESSION FUNCTIONS COMPUTED AND
REGRESSION COEFFICIENTS THEREOF compared over
SEGMENTED SUBINTERVALS OF SAMPLED
VACUUM PRESSURE DATA $F_I = y/_I = b_1 X + a_1$
$F_{II} = y/_{II} = b_2 X + a_2$
$F_{III} = y/_{III} = b_3 X + a_3$
$F_{IV} = y/_{IV} = b_4 X + a_4$
$F_V = y/_V = b_5 X + a_5$

METHOD AND APPARATUS FOR TESTING HERMETIC SEAL INTEGRITY OF SEALED PACKAGES AND CONTAINERS

BACKGROUND FOR THE INVENTION

This application is a continuation-in-part of copending U.S. application Ser. No. 811,868 filed on Dec. 20, 1985, now U.S. Pat. No. 4,663,964.

FIELD OF THE INVENTION

The present invention relates generally to test instrumentation for automatically, accurately, and simply determinating the physical properties of a mechanical system, such as for example, the hermetic seal integrity of sealed packages and containers. More particularly, the present invention relates to electronic measurement instrumentation for automatic, non-destructive testing and classification of sealed packages and containers, employing pressure and position sensors, and analog and digital signal processing techniques.

SETTING FOR THE INVENTION

In many areas of manufacturing of products, there is the need for sealed containers and packages, in which a product must be hermetically sealed. There are a variety of container and package types which are capable of protecting the product contained therein and preventing the transmission of air and the like to and from the product. In this connection, enormous research has been conducted in the areas of evaluating the barrier properties of packaging materials used for products whose stability rapidly degrades when subjected to air, but it has been discovered that the greatest impact on product stability is not the packaging material barrier, but rather the package seal. In fact, the highest priced, most impermeable material will not provide product protection if the packages being formed therefrom, are not well sealed. Also, often a less expensive material with higher quality sealing characteristics may out-perform a package comprising an expensive foil lamination, having a low quality package seal.

The types of containers and packages which have been the subject of study in regards to hermetic seal integrity, has included metal cans, flexible pouches, waxed paper containers, bottles, bags, vials, cartons, strip packages, blisters, pouches, and the like. While the above-listed types of containers and packages differ in many respects, there is a commonality among them, in that, once a product is placed inside such a container or package, and hermetically sealed therein, there generally remains a head space which can be either pressurized, as for example in a soda pop container, or depressured under a vacuum, as for example in a food container or a package containing a sterilized product. Or alternatively, a product can be hermetically sealed within a package at ambient pressure. Yet, regardless of what the initial internal pressure of a hermetically sealed package may be, the fact that a head space therein exists allows for a general class of hermetic seal testing techniques, which obviates visual inspection thereof. For example, an electron microscope is commonly employed since visual inspection of a package seal is wholly impractable in high-speed commercial environments.

In view of the foregoing problem, it becomes apparent that the principal question has been how to effectively measure, in real time, seal integrity of sealed packages, containers, and the like, and what sort of equipment provides a means to achieve the same. Also, since the degree of hermetic seal integrity required in the seal of each container or package differs for each application, an ideal testing system must provide a means of classifying and sorting sealed containers based on the acceptable limits for that package family. Furthermore, the ideal test instrumentation system must have the capability of handling various packaging forms and materials, such as plastic containers, foil packs, metal cans and plastic bags. Furthermore, this testing must be performable in a manufacturing environment where the operator must have immediate results on the performance of the packaging equipment in order to correct problems regarding hermetic seals, prior to the production of large quantities of rejected package seals. Also, the ideal test instrumentation system should provide a means to generate information useful in developing worldwide standards regarding acceptable hermetic seal limits on particular families of packages, and thereby prove useful in optimizing packaging materials, with a resultant savings in packaging cost. Finally, it is imperative that this test equipment be capable of performing these measurements and hermetic seal classification, without damage to the sealed container and its contents.

Presently there are a number of different types of test equipment used for automatic, non-destructive testing and classification of the hermetic seal integrity of sealed containers and packages.

For instance, U.S. Pat. No. 3,837,215, to Massage discloses a method and apparatus for automatic non-destructive testing and classification of sealed packages and containers. The containers are passed through a sealed vacuum or pressure chamber and expand or contract because of differential pressure gradients acting on the container walls. The magnitude of the leak rate of the sealed container under vacuum or pressure, is computed through a series of measurements, including computations of container wall travel (i.e., displacement), velocity of wall travel, and error corrections which cancel out errors due to container variables that are not controllable by the testing equipment. In this method, the computed leak rate magnitude is not degraded by such uncontrolled variables as interval pressure variations, wall thickness, etc. Containers with different wall thicknesses but identical leak rates, are computed and recorded as identical leak rates even though their wall travel is different. However, according to the Massage method, such an approach can be successful only if a unique error nulling technique is employed therewith, taking into account all physical container variables which are classifiable into four error categories:

1. Initial expansion—this includes all physical parameters that relate to the actual amount of initial expansion or bulge. It includes errors caused by variations in wall thickness, internal container pressure, strength of container, volume variations, modules, material heat treating, contour markings and impact of contour marking dies, and external ambient pressure;

2. Timed related contraction errors—this includes errors due to temperature change during testing, stability of the test chamber pressure, stability of test chamber position, and stability of test table-top.

3. Starting point errors and non linearity—this includes variations in height of container, orientation and accuracy of container in test stand with respect to sensor position, shape and form factor, wall flatness, uniformity, etc.

4. Dynamic range—because of the enormous spectrum of container variations, test measurement instrumentation will have an enormous range of signals to deal with. (It is much easier to detect a 1/1000 inch travel within a working range of 20/1000 inch than to find the same 1/1000 travel in a working range of 1 inch. By confining measurements with a narrow range, system accuracy and speed is tremendously enhanced.

SUMMARY OF THE INVENTION

In view of the above-recognized problems and the prior art solutions thereto, it therefore becomes a primary aspect of the present invention to provide a method and apparatus for testing the hermetic seal integrity of sealed packages and containers having at least one semi-flexible surface, and regardless of whether the package is tested under externally pressurized or depressurized (i.e., vacuum) conditions.

The present invention also provides a method and apparatus for testing the hermetic seal integrity of sealed packages and containers, which does not require the computation of container or package leak rates, nor require utilization of error correction techniques, but rather renders a decision regarding the airtightness of the test package, based on a computation of the degree of correlation between a first data signal proportional to the pressure within the test chamber and a second data signal proportional to the displacement of the semi-flexible surface of a sealed test package.

The present invention further provides a method and apparatus which is independent of process operating variables such as container or package size, wall thickness variations thereof, interval package pressurization, reference position, or level of fill material in test package.

The present invention is also designed to provide a method and apparatus which permits an operator to program acceptable hermetic seal integrity measures, not computed on the basis of container leak rates, or container wall velocities, and also to simply change the acceptable limits of hermetic seal integrity for a package family.

Also provided is a method and apparatus having application in high-speed in-process quality control of hermetic seal integrity testing of sealed packages and containers for perishables such as food, drugs, or other materials that must be hermetically sealed from contaminants.

The present invention additionally provides a method and apparatus which performs an external analysis of hermetically sealed packages, in-process, on line, and without requiring that the sealed container be opened, damaged, or permanently distorted.

The method and apparatus of the present system also eliminates the requirement for precision positioning mechanisms of package wall displacement sensors within a test chamber, or the accuracy of pressure in measurements within the test chamber.

The present invention has been developed to provide a method and apparatus for testing hermatic seal to integrity of sealed test packages and containers, involving the computation of linear regression functions from package displacement data values and test chamber pressure data values sampled during the interval of a test cycle. Such statistical analysis may involve computing one linear regression function over a test interval, or a plurality of linear regression functions over various segments of a test interval, where a comparison of the slopes of adjacent regression functions indicates where package venting occurs.

Furthermore, the method and apparatus of the present invention provides and records hermetic seal integrity data in addition to accept/reject data, for purposes of maintaining a better statistical history of packaging efficiency.

Also, the method and apparatus of the present invention has the capability of handling various packaging forms and materials, such as plastic containers, foil packs, metal cans, and plastic bags.

Additionally, the present method and apparatus is useful, not only in the initial packaging of goods, but also in subsequent testing, as to determine the shelf-life of the product.

In summary, from one of its aspects, the present invention embraces a method and apparatus for testing the hermetic seal integrity of sealed packages and containers having at least one flexible or semi-flexible component, part, or surface, that is capable of slight movement, such as collapse or distension when subjected to pressure or vacuum gradients, respectively.

The present invention operates primarily on the correlation principle, in which over a reasonable vacuum pressure range, a well-sealed package will expand proportionally in response to the application of a vacuum (i.e., depressuration of the test chamber in which the test package is placed). In such a case, the vacuum/expansion curve will exhibit linearity. Conversely, a sealed package having a low hermetic seal integrity or no seal at all, either will not expand in response to increasing vacuum conditions, or will expand intially and then will collapse as the package head space vents into the vacuum-type test chamber. In this case, the vacuum/expansion curve will exibit nonlinearity.

In general, the method of testing a sealed package or container for hermetic seal integrity, comprises placing inside a test chamber, a sealed test package with at least one flexible surface, and gradually changing the pressure within the test chamber from a first value to a second value, over the time interval of a test cycle. The pressure within the test chamber and the displacement (i.e., expansion or contraction) of the flexible surface of the sealed test package are both measured, and a first analog data signal proportional to the pressure within the chamber and a second analog data signal proportional to the displacement of the flexible surface of the sealed test package are produced, respectively. A correlation function is then computed from the first analog data signal and the second analog data signal, so to provide a measure of hermetic seal integrity of the sealed test package.

Thus, an even further result of the present invention is to provide a test instrument system for measuring the hermetic seal integrity of any sealed package capable of expanding when subjected to an applied vacuum under controlled pressure conditions.

The present invention accordingly comprises the method and apparatus, together with their steps, parts, components, and interrelationships, which are exemplified in the present disclosure, the scope of which will be indicated by the appended claims.

Other and further objects will be explained hereinafter and will be more particularly delineated in the appended claims, and other objects of the present invention will, in part, be obvious to one with ordinary skill in the art to which the present invention pertains, and will, in part, appear obvious hereinafter.

BRIEF DESCRIPTION OF THE DRAWINGS

For a further understanding of the objects of the present invention, reference is made to the following detailed description of the preferred embodiment, which is to be taken in connection with the accompanying drawings, wherein:

FIG. 6 is a systems view of the block circuit diagram of the test instrument system of the present invention, showing a test stand unit, a central programming unit, and an operator's console unit;

FIG. 7 is a high-level computer programming flow chart for the Main Package Tester (System) Program, used in the microcomputer realization of the present invention, showing in part, the various steps executed in testing the hermetic seal integrity of a sealed package, and displaying the results produced therefrom.

DETAILED DESCRIPTION

It is now in order to describe in a best mode embodiment, the details of the method and apparatus for testing the hermetic seal integrity of sealed packages. But before describing the details thereof, it is believed however, that a few preliminary remarks are in order.

Referring briefly to FIG. 6, there are illustrated the three major components of the test system instrument of the present invention; namely, a test stand 2, a central programming unit 3, and an operator's console 4. Although the test instrument system 1 hereof will test containers and packages under either pressurized or depressured (i.e., vacuum) conditions in substantially the same manner, the described preferred embodiment will be a system which tests packages under vacuum conditions.

Figure 1:
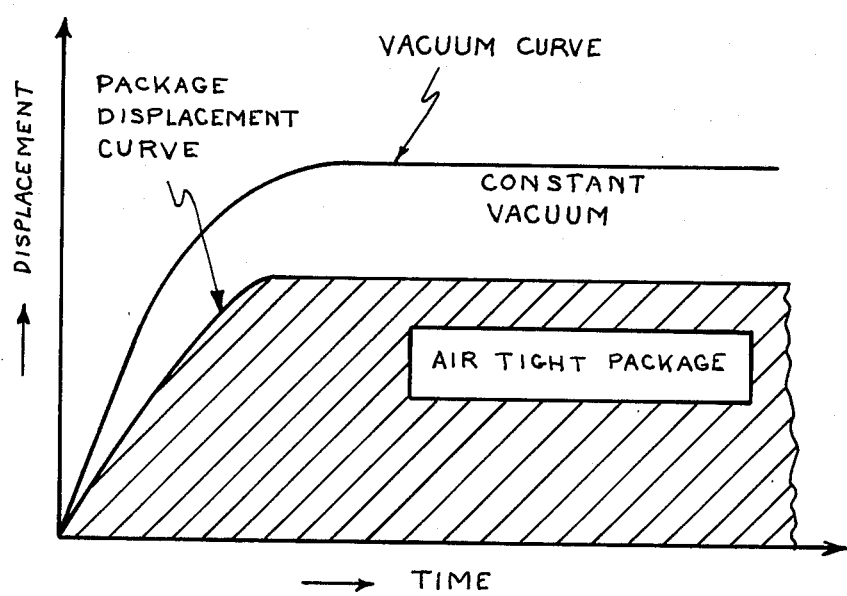
FIG. 1 is a graph diagram of a hermetically sealed test package, with no air leaks, showing the displacement of a flexible surface thereof displayed along the vertical axis and the lapse of time during a test cycle displayed along the horizontal axis, and also showing a vacuum-curve superimposed thereon with the magnitude thereof oriented along the vertical axis.
Figure 2:
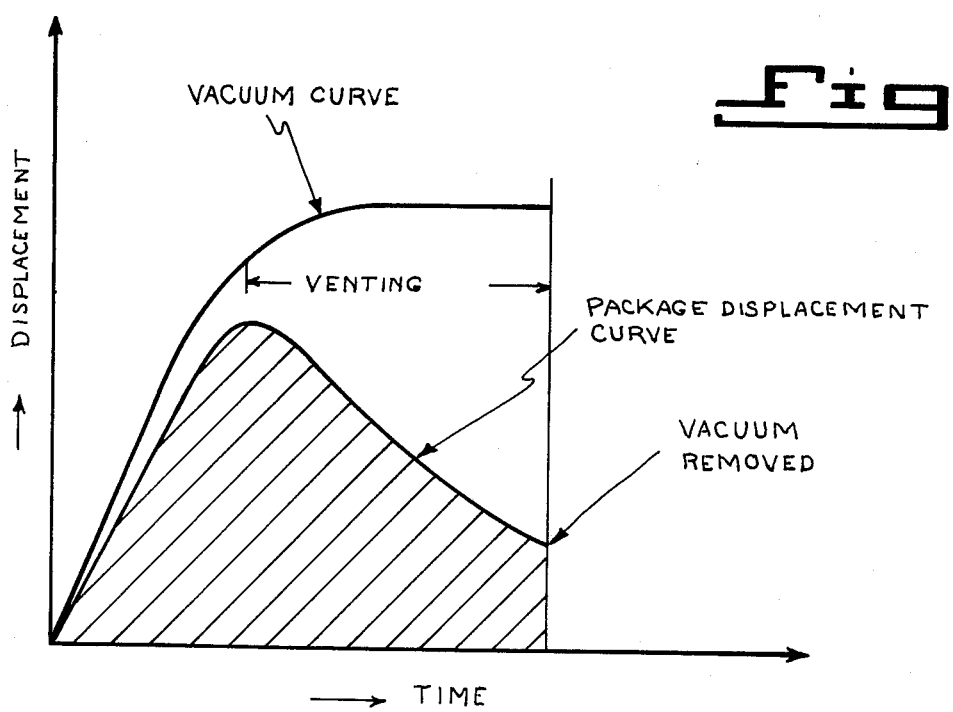
FIG. 2 is a graph diagram of a non-hermetically sealed test package which leaks air, showing the displacement of a flexible surface thereof displayed along the vertical axis, and the lapse of time during a test cycle displayed along the horizontal axis, and also showing a vacuum-curve superimposed thereon with the magnitude thereof oriented along the vertical axis.

Referring now to FIGS. 1 and 2 in particular, graph diagrams featuring package displacement curves and vacuum curves, are shown for both airtight and non-airtight packages, respectively. In connection therewith, if a flexible pouch or semiflexible package is placed in a test chamber being evacuated, then in response thereto, the sealed package will expand in an attempt to equalize its internal "head space" pressure in response to the decreasing pressure of the test chamber. An airtight package will expand and maintain its expanded volume for as long as the external vacuum is applied to the test chamber. In FIG. 1, the displacement (i.e., expansion) versus time plot for this condition is shown. In contrast, a non-airtight package, under the same conditions, will expand initially and then slowly collapse as the vacuum draws air from the package through the leak in its seal. In FIG. 2, the displacement versus time plot for this condition is illustrated. The rate at which the package expands and collapses under controlled conditions is a function of the degree of airtightness of the package. Also, over a reasonable vacuum range, a well sealed package will expand proportionally (i.e., linearly) with a decrease in vacuum pressure, and a regression analysis of package expansion data on vacuum pressure data will result in a linear regression function associated with a high correlation coefficient, indicating a high degree of correlation between package expansion and vacuum pressure, in the case of a package with high hermetic seal integrity. In contrast, an unsealed or poorly sealed package either will not expand, or will expand initially, and then collapse, as the package head space vents into the test chamber. In this case, a regression analysis of package displacement (i.e., expansion) data on vacuum pressure data will result in a linear regression function associated with a low correlation coefficient over duration of a test cycle, indicating a low degree of correlation between package expansion and vacuum pressure. It is upon this underlying concept that the present invention is based, and it will become more clearer as the method and apparatus hereof are described in greater detail.

Figure 3:
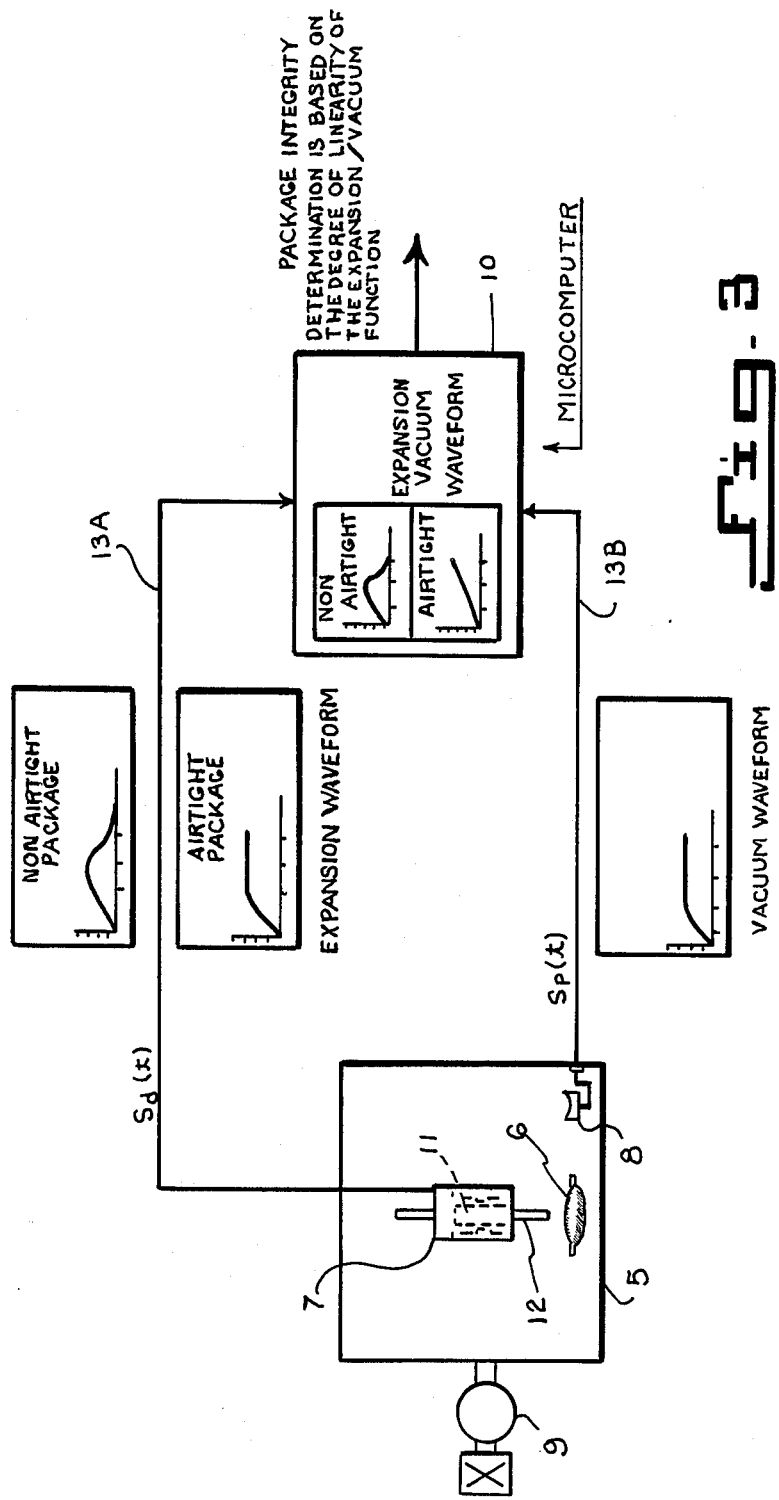
FIG. 3 is a simplified function diagram showing the necessary signal waveforms which must be generated and processed to produce a measure of hermetic seal integrity of a sealed package, in accordance with the method therefor of the present invention.

Turning now to FIG. 3, a simplified function diagram is shown which clearly illustrates the two necessary aperiodic signals (i.e., waveforms) which must be generated and processed to produce a reliable measure of hermetic seal integrity in accordance with the method of the present invention. Specifically, the simplified function diagram of FIG. 3 shows a test chamber 5 on the left side thereof with a test package 6, a Linear Variable Differential Transformer (LVDT)-type position or displacement sensor (i.e., transducer) 7, and a pressure sensor 8 preferably placed within the test chamber 5. Also shown is a vacuum pump 9 connected to the test chamber 5. On the right side of the function diagram, is a computational device, preferably a microcomputer 10 with necessary and sufficient memory storage.

Notably, once the package is placed in the test chamber 5 and the LVDT-type position sensor 7 is brought into contact with the flexible surface of the test package 6, from that point forward during a test cycle, this position sensor 7 must be capable of measuring any changes in package thickness as a result of expansion under decreasing test chamber pressure. During a test cycle, a signal must be generated from the position sensor 7, which provides an indication of the movement of the flexible surface of test package 6 in response to a decrease in test chamber 5 pressure levels. In the preferred embodiment, this signal is produced by movement of a core rod (not shown) in the LVDT 7 in response to displacement of test package surface against test probe 12. This signal is shown as a line 13A which extends upwardly out of the test chamber 5 and across to the block for the microcomputer 10. As indicated above the line 13A, there is a displacement versus time waveform obtained from a typical non-airtight package during a test cycle. Beneath this line, there is the displacement versus time waveform obtained from a typical airtight package during a test cycle. These waveforms are referred to in this disclosure as the second analog data signal proportional to the displacement of the flexible surface of a test package 6, which is delivered to the microcomputer 10 for subsequent processing.

The second signal which must be generated and delivered to the microcomputer 10, is the vacuum pressure signal within the test chamber 5, which represents the vacuum condition at the corresponding package displacement. This vacuum pressure signal generated during a test cycle and transmitted to the microcomputer 10, is shown as a line 13B which extends from the bottom of test chamber 5 and extends into the microcomputer. A typical vacuum pressure waveform is shown below the vacuum signal line 13B, and indicates the transmission thereof to the microcomputer 10 during the same time period that the expansion (i.e. displacement) waveform is transmitted thereto.

Figure 9A:
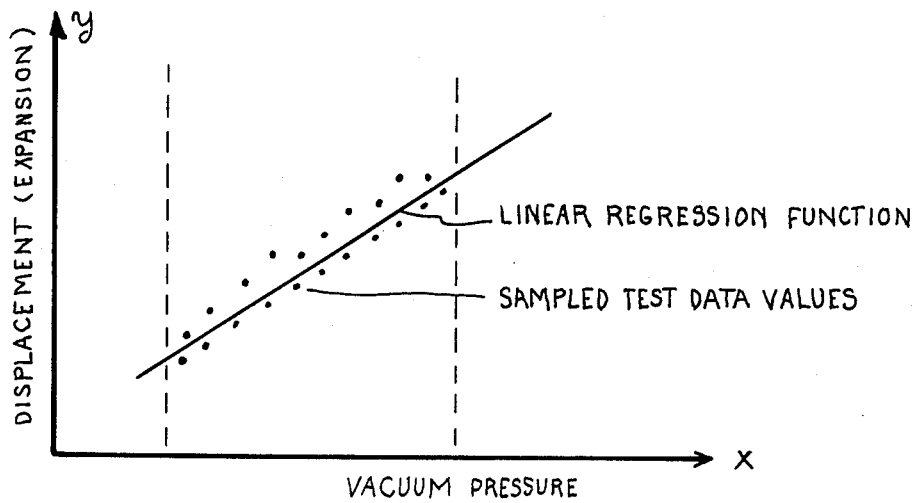
FIG. 9A is a graph diagram of a hermetically sealed test package, with no air leaks, showing sampled data values of the displacement (i.e., expansion) of a flexible surface thereof displayed along the vertical axis, and sampled data valves of vacuum pressure of the test chamber hereof displayed along the horizontal axis, and also showing a linear regression function superimposed thereon, computed over the entire test interval.
Figure 9B:
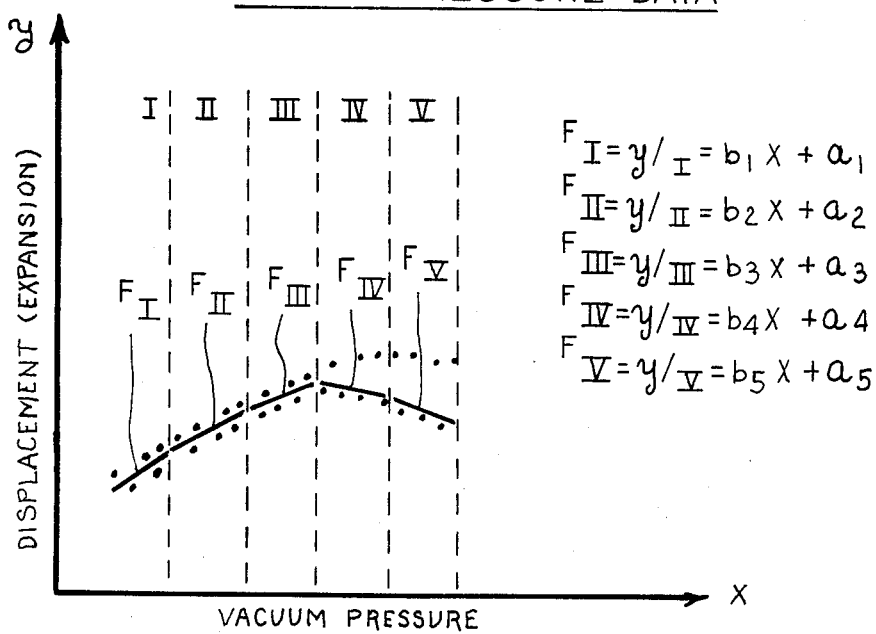
FIG. 9B is a graph diagram of a non-hermetically sealed test package which leaks air, showing sampled data values of the displacement of a flexible surface thereof displayed along the vertical axis, and sampled data values of vacuum pressure of the test chamber hereof displayed along the horizontal axis, and also showing a plurality of linear regression functions, each of which have been computed over its segmented subinterval, and where the change in slope of adjacent linear regression functions indicates departure of dependence of package displacement on vacuum pressure.

By means of mathematical analysis, such as statistical analysis of stochastic processes, a correlation estimate between the vacuum pressure and package expansion (i.e., displacement) signals can be determined using the microcomputer 10, so to produce a reliable and accurate measure of hermetic seal integrity of sealed packages and containers. Alternatively, by performing a regression analysis of the package expansion signal and the vacuum pressure signal, over the duration of a test cycle, the point at which the package expansion signal fails to depend on the vacuum pressure signal can be determined, and thereby provides information regarding the conditions under which a test package begins to leak air, and consequentially, a reliable measure of hermetic seal integrity. In this connection, reference is made to FIGS. 9A and 9B, where it is illustrated in FIG. 9B in particular, that in this preferred embodiment, the regression analysis may involve, for example, (i) performing a segmental-type linear regression analysis of sampled package expansion data on sampled vacuum pressure data over arbitarily segmented intervals of vacuum pressure, and (ii) comparing the computed slopes of adjacent linear regression functions as to determine at what values of vacuum pressure, dependence of package expansion on vacuum pressure begins to fail, and so too the hermetic seal integrity of the test package.

Figure 4:
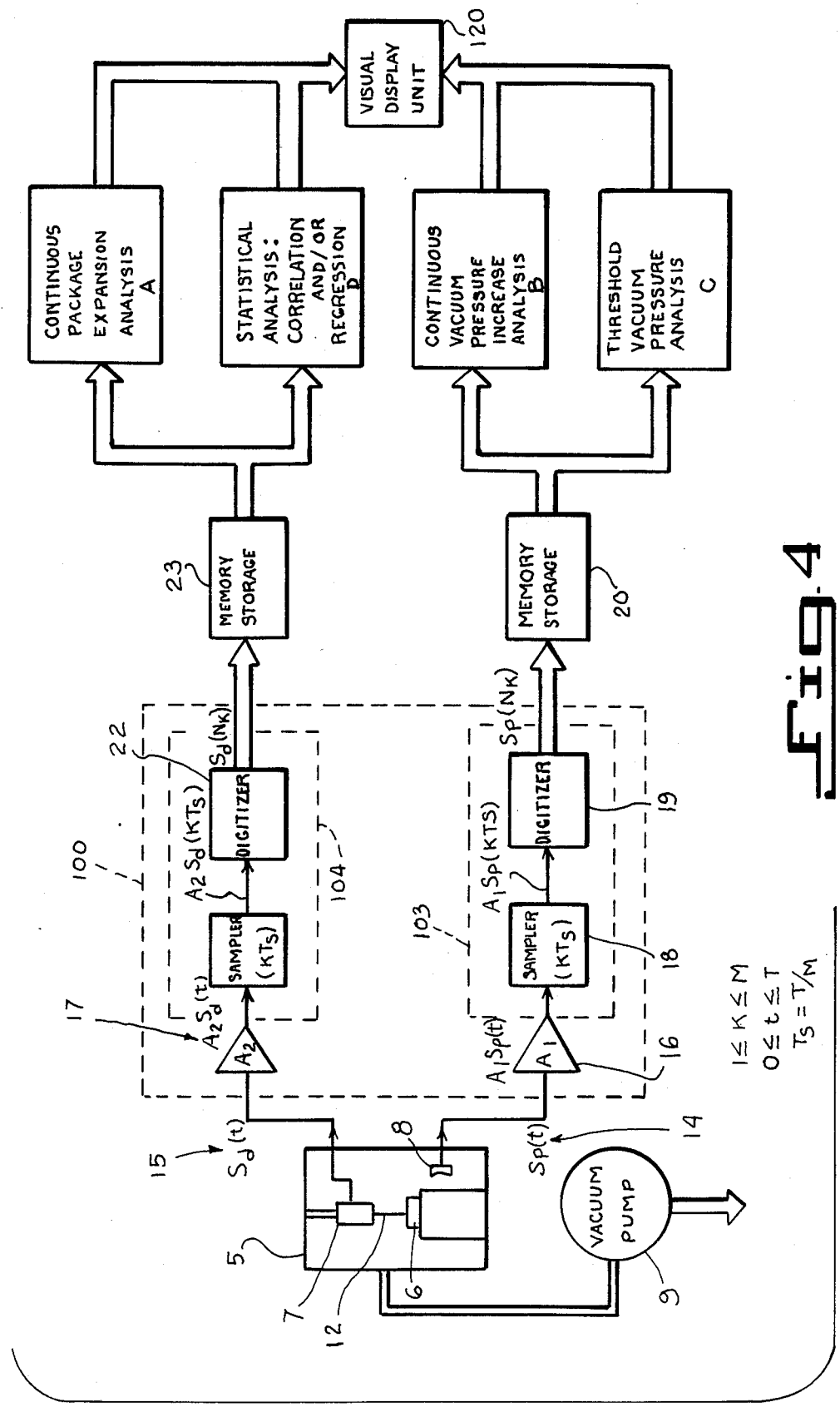
FIG. 4 is a detailed function diagram illustrating the various analog and digital signal processing operations performed during a test cycle interval of the method of the present invention.

Referring now to FIG. 4, another function diagram is shown, illustrating in greater detail, the analog and digital signal processing operations of the method of the present invention. In accordance with such method of testing a package for hermetic seal integrity, the sealed test package 6 with at least one flexible surface, is placed within the test chamber 5, and the LVDT-type position (i.e., position) sensor 7 is adjusted with respect to the semi-flexible surface, so that the probe 12 thereof is in contact therewith as to measure the slightest expansion of the package 6 in response to a decrease in test chamber pressure. Gradually, the pressure level within the test chamber 5 is changed from a first value to a second value, over the time interval T of a test cycle, and therewhile, both a first analog data signal $S_p(t)$ 14 proportional to the test chamber pressure, and a second analog data signal $S_d(t)$ 15 proportional to corresponding test package expansion (i.e., flexible surface displacement) are produced from the pressure (i.e., vacuum) sensor 8 and the position (i.e., expansion) sensor 7, respectively.

If necessary for purposes of scaling, sensor calibration, and/or visual display, then either one of or both the first and second analog data signals are amplified by linear analog amplifiers 16 and 17, respectively. From points along the first analog data signal $S_p(t)$, vacuum pressure sample values are taken by sampler 18, at time interval $T_s$ over the test cycle interval T ($0 \leq t \leq T$ and $10 \leq T \leq 30$ Seconds), to produce a first discrete data signal $S_p(kT_s)$, which is then digitized (i.e., converted to digital representation) by digital converter 19 to produce a first digital data sequence $S_p(N_k)$ which is then stored in volatile memory storage 20, such as for example, in Random Access Memory.

Similarly, from points along the second analog data signa $S_d(t)$ 15, vacuum pressure sample values are taken by sampler 21 at time interval $kT_s$ over the test cycle interval T, to produce a second discrete data signal $S_d(kT_s)$, which is then digitized by a digital converter 22, and stored in volatile-type memory storage. Plots of these two discrete data sequences $S_p(N_k)$ and $S_d(N_k)$ are visually displayed as two superimposed yet distinct graph diagrams, preferably on a Cathode Ray Tube (CRT) visual display unit 120 during the execution of the test cycle.

During the test cycle, several real-time test procedures are executed in order to ascertain:

(i) whether the test package undergoes continuous expansion in response to decrease in test chamber pressure for purposes of early detection of package leaks; and (iia) whether the test cycle is being operated under controlled pressure conditions; or (iib) under vacuum conditions at all, as to ensure reliable comparison of computed hermetic seal integrity measures against empirically determined standards.

Regarding query (i), second discrete data sequence $S_d(N_k)$ in FIG. 4 is monitored at early phases of the test cycle, (i.e., after first 10 test data samples, approximately 5 seconds) to determine whether or not the flexible surface of the test package 6 undergoes continuous expansion, indicative of the absence of a gross leak in the test package. If the test 6 package has not undergone continuous expansion during this time interval, then the test cycle is terminated and a "Package Not Airtight" message will appear on the screen of the visual display unit 120. The method by which such a failure is determined in the preferred embodiment, is by computing a "rolling" average of package expansion, based on for example, the last 5 sample data values of the second discrete data signal $S_d(N_k)$, and by comparing the present sample data value with the rolling average. This is achieved by computational test procedure A in FIG. 4, which ensures that if the package is determined to be expanding during this time interval, then the test cycle will proceed for its entire test interval.

Regarding query (iia), the first data sequence $S_p(N_k)$ in FIG. 4 is analyzed during early phases of a test cycle, (e.g., after the first 4 sample data points, approx. 2 secs.), to determine whether or not the pressure of the test chamber 5 is decreasing (i.e., vacuum increasing), indicative of proper functioning of the vacuum pump 9. This is achieved by computational test procedure B in FIG. 4, which ensures that if the test chamber pressure is not continuously decreasing during this time interval, then the test cycle is terminated and a "Vacuum Error" message will appear on the screen of the visual display unit 120.

Regarding query (iib), the first discrete data sequence $S_p(t)$ is analyzed during the entire test cycle, to determine whether or not the test cycle is being operated under controlled pressure conditions. This determination is made by executing in real-time, a threshold-pressure-value analysis during the entire test interval of a test cycle. This analysis is achieved by computational test procedure C in FIG. 4, which involves comparing a plurality of predefined threshold pressure values with corresponding values of the first discrete data sequence $S_p(N_k)$, at times 1 second, 15 seconds, and 30 seconds respectively, for $T_s = 0.5$ and $T = 30$ seconds, and upon the occurance of one of the corresponding values of the first discrete data sequence not equalling the corresponding predefined pressure threshold values, then terminating the test cycle and displaying a "Vacuum Error Message" on the visual display unit 120, as an indication that the test cycle was not conducted under controlled pressure conditions.

If at the end of the test cycle, neither of computational test procedures A, B or C in FIG. 4, produce an error message and effect a consequential termination of the test cycle, then the microcomputer 10 hereof will proceed to compute, from the stored first and second discrete data sequences $S_p(N_k)$ and $S_d(N_k)$ respectively, a statistically-based correlation estimate, as a measure of the hermetic seal integrity of the seal test package. In the preferred embodiment of the present invention, the statistically-based correlation estimate indicated by Procedure D in FIG. 4, would be a coefficient of correlation, but other statistical measures would also serve the objects of the present invention.

At this juncture, it is appropriate to briefly review the principles and concepts of statistical analysis of stochastic processes, which, in part, underlies the mathematical aspects of the method of the present invention.

In general statistical usage, correlation or co-relation, refers to the departure of two variables from independence. In this broad sense, there are several coefficients measuring the degree of correlation, and perhaps adapted to the nature of the data, e.g., association coefficient for dichotomous material, contingency coefficient for more extended classification, rank correlation for ranked material, and so on.

In a narrower sense, correlation refers to the degree of dependence of two continuous variables. As illustrated in Van Nostrand's Scientific Encyclopedia, Sixth Edition, Volume One, on Pages 792–793 under "Correlation", and also in Chamber's Dictionary of Technology and Science, (1974), Volume One, on Page 277 under "Correlation", a measure of correlation between two variates x and y is given by the correlation coefficient, also called Pearson's coefficient. If the variates take the values $x_1, x_2, \ldots x_M$ and $y_1, y_2, \ldots y_M$, with means values x and y respectively, or alternatively, given a set of bivariate values $(x_1, y_1) \ldots (x_i, y_i) \ldots (x_M, y_M)$, then the coefficient of correlation is given by $$r = \frac{\sum_{i=1}^{i=M}(x_i - \bar{x})(y_i - \bar{y})}{\left[\sum_{i=1}^{i=M}(x_i - \bar{x})^2 \sum_{i=1}^{i=M}(y_i - \bar{y})^2\right]^{\frac{1}{2}}} \quad (1)$$

which is equal to, namely, the covariance of x and y divided by the square root of the product of their variances. Notably, the mean values of x and y are given by $$\bar{x} = \frac{1}{M} \sum_{i=1}^{i=M} x_i \text{ and } \bar{y} = \frac{1}{M} \sum_{i=1}^{i=M} y_i \quad (2)$$

respectively, the statistical measure r may vary between the limits $+$ or $-1$. A value of zero results when the variables are completely independent, but strictly implies independence only when the variables are jointly distributed in the normal (i.e., Gaussian) form. If $r = \pm 1$, then there is complete correlation and one variate may be calculated from the other.

At this juncture, it is appropriate to briefly discuss a particular class of statistical linear models upon which the method of the present invention is preferably, but not exclusively, directed.

As illustrated in Encyclopedia Dictionary of Mathematics on Pages 1222–1223, of the English translation by MIT Press (1977), it is known in theoretical mathematical analysis, that among the methods of statistical analysis of linear models, are (i) regression analysis, (ii) analysis of variance, and (iii) analysis of covariance, but these are not clearly distinguishable from each other. In connection with the mathematics of regression analysis, in particular, it is known that any two random variables that are linearly correleated with a correlation coefficient of less than 1, will display a behavior of conditional expectation of the second variable, on the basis of a given value of the first value. This behavior is commonly known as the regression phenomenon.

In statistics, the term regression has two somewhat different meanings, although the analysis in both cases is identical.

The first case is concerned with a bivariate distribution, say of x, y, wherein there will be a relation between the values of x and the mean of the values of y for a given value of x. This is the regression of y on x. For bivariate normal variation, the regression is linear. Likewise, there will be a regression of x on y, which in general is different from the regression of y on x. From this viewpoint, the regression relationships can be considered as generalizations to stochastic situations of the functional relations of mathematics: the regression of y on x shows the dependence of the mean of a distribution of y values, for assigned values of x.

The second case is concerned with stochastic processes, wherein, from a more general viewpoint, x need not be a random variable and the stochastic variation lies solely in y, so that the functional relationship is of the type $y = f(x) + \epsilon$, where $\epsilon$ (and therefore y) is a random variable.

In both cases, however, the parameters of the relationships are usually estimated by the Method of Least Squares, i.e., by minimizing the sum of squares of the residuals $\epsilon$. This is optimal if the $\epsilon$ have a normal distribution with the constant variance for all values of x. In order to determine whether the regression of y on x is linear (i.e., shows dependence of the mean of a distribution of y values, on assigned values of x), it is helpful to perform a graphical analysis of the sampled data of the two variables, by drawing a "line of regression" against the sampled data of x and y. In the most general sense, the line of regression may serve to represent the trend of such set of data. This line of regression, in the case of two variables, is determined by the bivariate regression function, which is specified by the regression coefficients.

In connection with regression, it is illustrated in James & James Mathematics Dictionary, Third Edition, by D. Van Nostrand Company, Inc., that if two variables y and x are correlated such that $y_i = E_y(x_i)$ is the "conditional expectation" of y given x, then the coefficients in the function $E_y(x_i)$ are the regression coefficients. Thus, if $y_i = E_y(x_i) = a + b\, x_i$, then a and b are regression coefficients. Sometimes only b is called a regression coefficient. Least-squares estimates of regression coefficients in a linear bivariate regression function $y = a + b\, x$, may be obtained from $$a = \frac{1}{M} \sum_{i=M}^{i=M} y_i - b \sum_{i=1}^{i=M} x_i \quad (3)$$

$$b = \frac{\sum_{i=1}^{i=M} (x_i - \bar{x})(y_i - \bar{y})}{\sum_{i=1}^{i=M} (x_i - \bar{x})^2}$$

where $\bar{x}$ is the mean or expectation of x, and $\bar{y}$ is the mean or expectation of y. If y, at least, is a random variable, then these estimates are minimum variance, unbiased, and consistent estimates.

Also, as illustrated in Van Nostrand's Scientific Encyclopedia, Sixth Edition, Volume Two, on Page 2426 under "Regression", there are various generalizations in a multivariate complex. One variable y may be regressed on a number of others, for example in the linear form $$y = \beta c + \sum_{i=1}^{i=M} \beta i \cdot x_i + \epsilon \quad (4)$$

which expresses the way in which the mean of y varies according to assigned values of x. Again, the x values need not themselves be random variables but could, for example, be predetermined in a controlled test experiment. Further generalizations include the case where other functions of the x values appear, e.g., powers thereof or where the random variables are not independent from one observation to another.

The goodness of fit of a regression equation is judged by the variance of the random element E as a proportion of the variance of y, small values meaning a good fit. Alternatively, use may be made of the complementary quantity $R^2 = 1 - \text{Var} / \text{var } y$, known as the Square of the Multiple Correlation Coefficient. A more detailed discussion of correlation estimates and regression analysis is provided in the Mathematic Handbook for Scientists and Engineers, Second Enlarged and Revised Edition (1968) by G.A. Korn and T.M. Korn, McGraw-Hill Book Company, on Pages 605–611, 697–703, and 712 and 713.

As previously mentioned herein, the underlying concept of the present invention, is that a sealed package with a high integrity seal (i.e., no leaks) will linearly expand with proportional increases of vacuum (i.e., decreases in test chamber pressure), and that a package with air leaks will not. Moreover, since in the preferred embodiment the test chamber pressure is to be varied under controlled conditions, it is properly termed an independent variable. Accordingly, the second case as discussed above, properly characterizes the stochastic process of the present invention, and similarly, a correlation coefficient of a value close to 1 will signify a high degree of dependence between package expansion and increases in vacuum pressure, indicative of a high integrity hermetic seal. Thus, these two statistical measures (i.e., coefficient of correlation and linear regression function), taken separately or jointly, provide reliable measures of hermetic seal integrity, and thus provide a reliable basis for rejecting or accepting a package under testing.

Provided below is one particular formulation of a coefficient of correlation which provides a reliable measure of the degree of correlation between package expansion and test chamber vacuum conditions:

$$\frac{\left[ M \sum_{k=1}^{k=M} x_k y_k \right] - \left[ \sum_{k=1}^{k=M} x_k \cdot \sum_{k=1}^{k=M} y_k \right]}{\left[ \left[ \left[ M \sum_{k=1}^{k=M} x_k^2 \right] - \left[ \sum_{k=1}^{k=M} x_k \right]^2 \right] \cdot \left[ M \sum_{k=1}^{k=M} y_k^2 - \left[ \sum_{k=1}^{k=M} y_k \right]^2 \right] \right]^{\frac{1}{2}}} \quad (5)$$

where $(x_1, x_2, x_3 \ldots x_M)$ $X_M$ is a vector representation of the first discrete data sequence $S_p(N_k)$, and $(y_1, y_2, y_3, \ldots y_M) = y_M$ is a vector representation of the second discrete data sequence $S_d(N_k)$. Also, M equals the total number of sample data pairs $(x_k, y_k)$ sampled during test interval T. It has been discovered that taking 60 samples from each of the first and second analog data signals, over a test interval $T = 30$ seconds, provides reliable test results.

The above formulation has been designed for and adapted to the nature of the statistical data obtained during a test cycle, and has been empirically tested and compared against other hermetic seal integrity tests employing trace gas monitoring techniques.

However, the general formulation of the correlation coefficient provided in equation (1) may also be employed to compute a correlation estimate using the test instrument system 1 hereof, and without departing from the scope and spirit of the present invention To determine whether a linear dependence exists between the package expansion and vacuum data samples, the line of regression is computed from the regression coefficients of the equation of linear regression, using the above-mentioned Least-Squares formula. The line of regression is then plotted against the corresponding sample values of package expansion versus test chamber vacuum pressure, to visually determine the correlation between values of vacuum pressure and the mean of the values of package expansion for given vacuum pressure.

In summary, then, the correlation estimate in the prefered embodiment of the method hereof, is a correlation coefficient between the vacuum pressure and the corresponding package expansion. Also as an additional statistical measure of hermetic seal integrity, a regression analysis of the first discrete data sequence on the second discrete data sequence is performed, as the package expansion variable and vacuum pressure variable are known to be linearly correlated whenever the coefficient of correlation is less than 1. Based on the degree of correlation between the first and second discrete data sequences (representing the chamber vacuum pressure and test package expansion respectively), as indicated by the coefficient of correlation, the microcomputer hereof makes a "Go/NoGo" decision on the hermetic seal integrity of the sealed test package.

Figure 5A:
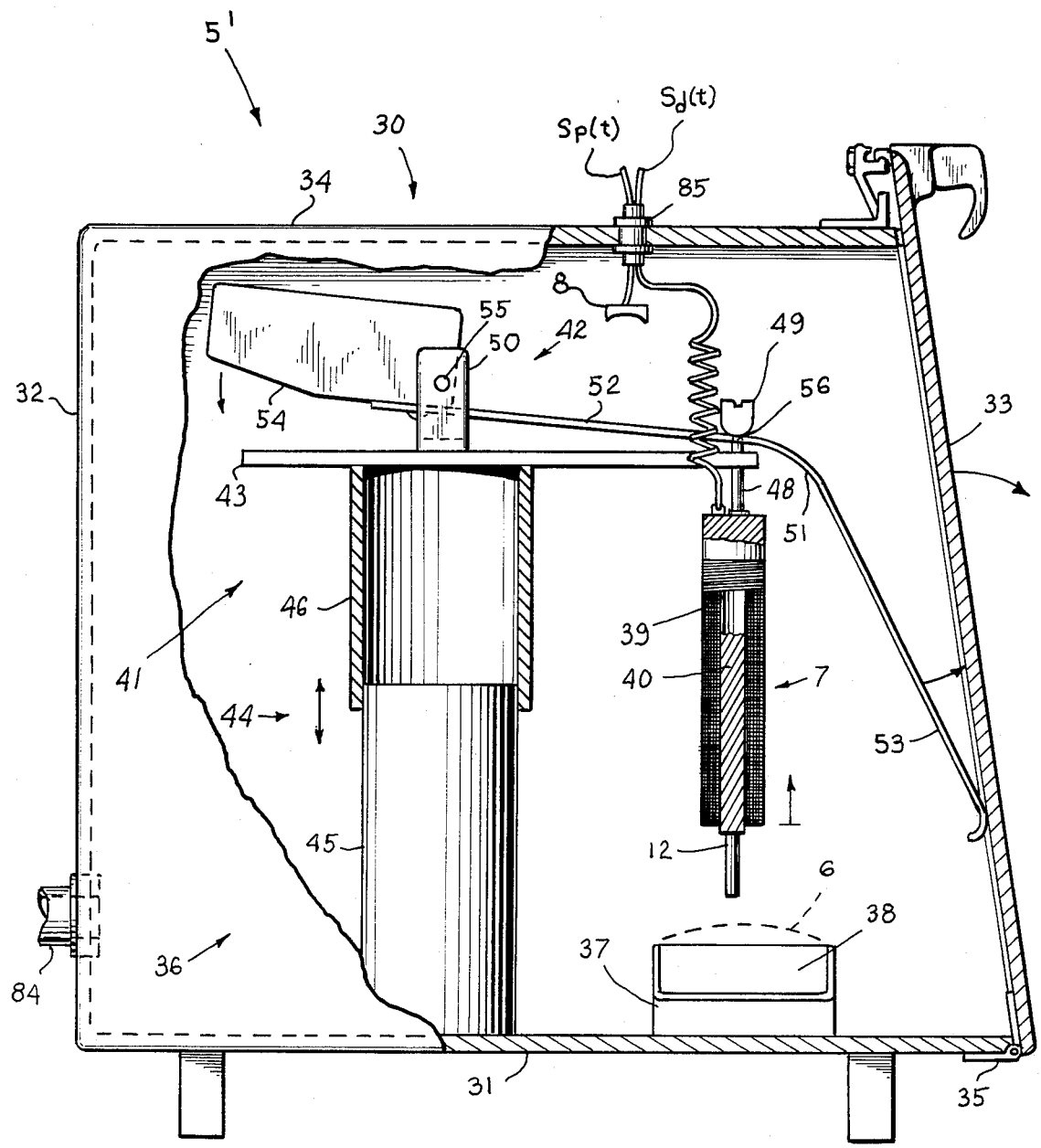
FIG. 5A is a cross sectional view of a schematic diagram of the preferred embodiment of the test chamber hereof, showing a vertical platform translator, a cantilever-type translator for a position sensor, a test package within a test tray, and a Linear Variable Differential Transducer (LVDT)-type position sensor.
Figure 5B:
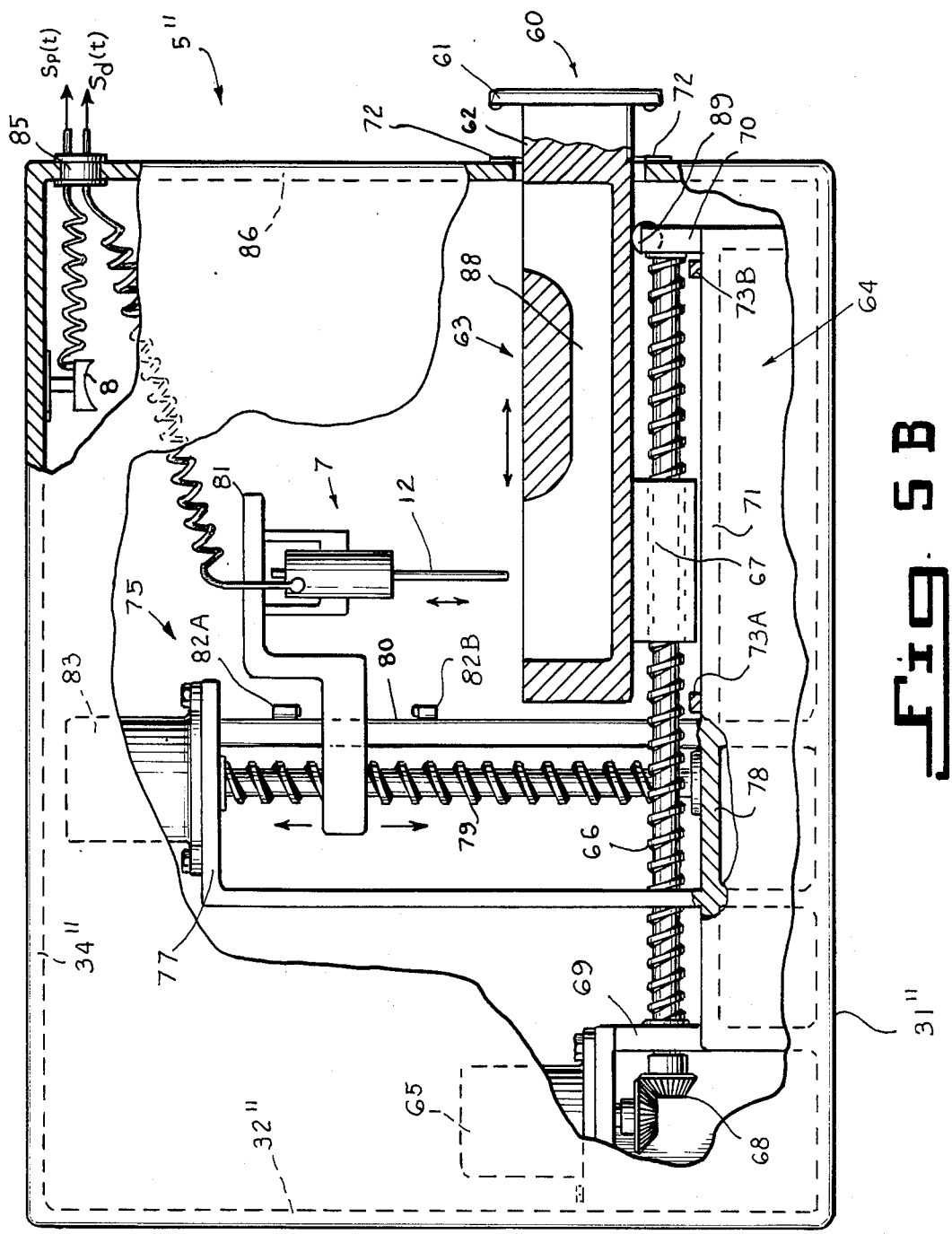
FIG. 5B is a cross sectional view of a schematic diagram of an alternative embodiment of the test chamber hereof, showing a vertical translator for a position sensor and a slidable test chamber drawer disposed on a horizontal translation device.

Referring to FIGS. 5A and 5B, the preferred embodiment and alternative embodiment of the test chamber 5 hereof are illustrated respectively therein. In the preferred embodiment, the test chamber 5' includes an enclosure 30 having a base 31, walls 32, a hinged door 33, and a top panel 34. A hinge 35 is located at the bottom of the door such that the door 33 swings open outwardly from the top panel 34. The test chamber 5' contains the position (i.e., displacement or expansion) sensor 7, a position sensor positioning mechanism 36, and a test tray 37 containing an insert 38 for holding a specific test package 6'. The position sensor 7 is preferably a LVDT-type transducer which comprises a cylindrical transformer 39 and a free-floating core rod 40 passing therethrough, such that, when the core rod 40 moves within the cylindrical transformer 39, a voltage signal is generated proportional to the displacement of the core rod 40 with respect to the cylindrical transformer 39. One end of the core rod 40 is attached to the test probe 12 which when displaced by the expanding surface of the test package 6', effects a voltage signal from the LVDT-type transducer which is linearly proportional to the degree of package expansion, over its range of linear operation.

The position sensor positioning mechanism 36 comprises generally, a vertical platform translator 41 and a cantilever-type translator 42 for positioning the position sensor 7. The vertical platform translator 41 comprises a platform 43 supported by an elevator mechanism 44 which could be either a stepping motor, hydraulic device, air cylinder, or the like. For schematic simplicity, the platform 43 is supported by a cylinder 46 into which one end of a piston 45 is slidably coupled, and the other end of piston 45 is mounted to the base 31 of the test chamber 5'. At the end of the platform 43 which extends over the test tray 37, a hole 47 therein is formed, through which a support shaft 49 slidably passes. At the lower end of the support shaft 48, the LVDT-type transducer 7 is supported, and at the upper end thereof, a knob 49 is attached to delimit the downard movement of the support shaft 48.

The cantilever-type translator 42 includes a bracket 50 centrally mounted atop the platform 43 above the elevator mechanism 41 and a cantilever member 51 having a first linear member 52 and a second linear member 53. The first linear member 52 is connected at one end, to counterweight 54 which pivots on a spindle 55 passing through the bracket 50. Near the other end of the first member 52 is a hole 56 formed therein, through which passes the support shaft 48 such that the first member 52 is interposed between the knob 49 and the platform 43. The second member 53 of the cantilever member 51 extends towards the hinged door 33 and touches the same when the door is in its closed position. With such an arrangement, the LDVT-type transducer 7 is lifted vertically upward and away from the test tray 37 when the hinged door 33 is opened, by way of cantilever operation of the cantilever-type translator 42. Similarly, when the door 33 is closed, the second member 53 of the cantilever member 51 is engaged and displaced downwardly, resulting in the lowering of the LVDT-type transducer 8 towards the test tray 37. Notably, the function of the cantilever-type translator 42 is course automatic position adjustment of the LVDT-type transducer 7.

In contrast, the function of the vertical platform translator 41 is to provide fine controllable position adjustment of the LVDT-type transducer 7, so that the probe 12 just establishes contact with a semi-flexible (i.e., expandable) surface of the package 6', whereby the positioning of the LVDT-type transducer 7 is within the linear operating range thereof. The vertical platform translator 41 is controlled by conventional logic circuits (not shown) which measure and control the limits of vertical translation of the platform 43 so that the LVDT-type transducer 7 may be utilized over its predetermined maximum range of linear operation. Such measurement can be achieved by optical or mechanical interrupt switches (not shown) or by any other means which is well-known in the art.

Referring to FIG. 5B, an alternative embodiment of the test chamber 5" hereof, will now be described in detail. In this alternative embodiment, the test chamber 5", as in the preferred embodiment, has walls 32", a top panel 34", and a base 31", but also has a slidable test chamber drawer 60 comprising a front drawer panel 61 attached to a slidable drawer 62. Installed within the cavity of the slidable drawer 62 is an insert 63 into which a test package may be simply inserted and securely held during a test cycle. Within the test chamber 5", the slidable drawer 62 is mounted onto and travels along a horizontal translation device 64 which includes a stepping motor 65, a guide bar (not shown) and a parallelly disposed lead screw 66. The horizontal translation device 64 also includes a platform follower 67 to which the slidable drawer 62 is connected and which horizontally translates the slidable drawer 62 along the guide bar and lead screw 66, so as to allow external insertion and removal of test packages therefrom.

The stepping motor 65 may be coupled to the lead screw 66 by way of a bevel gear 68, and the lead screw 66 supported at its ends by way of orthogonally disposed mounting brackets 69 and 70 of a fixture 71. The bracket 70 which is closest to the front drawer panel 61 has a roller 74 mounted thereon to provide frictionless translation of slidable drawer 62. To ensure that the platform follower 67 travels along the guide bar and lead screw 66 over appropriate ranges, as to (1) establish proper sealing between the front drawer panel 61, the front wall 86, and a gasket 72 interposed therebetween, and to (2) allow easy insertion and removal of test packages, two limit switches 73 and 74 are provided in addition to necessary logic control circuits (now shown).

Optionally, a spring loaded-type horizontal translation device can be used in lieu of the horizontal translation device 71, in order to achieve the same mechanical function. Within the test chamber 5", a vertical platform translator 75 is shown, having a similar function and operation to the one disclosed in FIG. 5A, but realized somewhat differently. The vertical platform translator 75 in FIG. 5B includes a fixture 76 having a first and second bracket 77 and 78, a vertically disposed lead screw 79 and guide bar 80 supported in the brackets 77 and 78 disposed parallel to each other. The vertical platform translator 75 also includes a platform follower 81 to which the LVDT-type transducer 7 is mounted, and which travels vertically along the guide bar 80 and lead screw 79 as a stepping motor 83 rotates the lead screw 79 in response to a power control signal (not shown). Also, to ensure that the platform follower 81 travels vertically along the guide bar 80 and lead screw 79 over appropriate ranges as to avoid (1) damaging the test probe and (2) saturation of the LVDT cylindrical coil, two limit switches 82A and 82B are provided in addition to necessary logic control circuits (not shown).

For removal of atmosphere in test chambers 5' and 5", a vacuum port 84 is provided, which controls, in part, the rate at which atmosphere may be moved into or out of the test chamber. Also, an output port 85 is provided through a test chamber wall, in order to pass to the outside of test chamber, signals $S_p(t)$ and $S_d(t)$ generated by the pressure sensor 8 and position sensor 7 respectively.

Referring now to FIG. 6, a systems-view block circuit diagram of the test instrument system 1 hereof is shown comprising three major components: the test stand unit 2; the central programming unit 3; and the operator's console unit 4, each of which will be described in detail hereinbelow. The system block circuit diagram of FIG. 6 is somewhat generalized in nature, however it clearly illustrates the interconnections and interrelationships of the various components of the test instrumentation system 1 hereof.

The test stand unit 2 includes the test chamber 5, as in FIGS. 5A or 5B for example, which is connected to a vacuum pump system 90. In the preferred embodiment hereof, the vacuum pump system 90 includes a vacuum pump 91 which is connected as to evacuate a relatively large holding tank 92. The large holding tank 92 is connected to a small holding tank 93 by suitable piping passing through a first solenoid valve 94. The small holding tank 93 includes a pressure sensor 95, and is connected to an exhaust line 96 passing through a second solenoid valve 97. The exhaust line 96 is connected to an air relief port 98 through a third solenoid valve 99.

The exhaust line 96 is connected by means of a suitable fitting, to the test chamber 5.

Shown mounted within the test chamber 5 is the pressure sensor 8 and the position (i.e., displacement or expansion) sensor 7. Notably, various types of position sensors may be employed with the present invention, and as discussed hereinbefore, one which has been found useful is the LVDT-type transducer. However, other type position sensors which can be used are proximity and optoelectronic transducers. The outputs of the sensors 7 and 8 are connected to a suitable cable, which is passed to the outside of the test chamber 5, through a suitable port formed therethrough. From these two outputs, analog signals $S_d(t)$ and $S_p(t)$ are delivered to the central programming unit 3.

In the preferred embodiment hereof, the central programming unit 3 includes a dual-channel preprocessor 100. The dual-channel preprocessor 100 has an X-channel and a Y-channel for transduced pressure and displacement signals, $S_p(t)$ and $S_d(t)$, respectively. Each X and Y channel has its respective analog signal conditioner 101 and 102 respectively and analog to digital (A/D) converter 103 and 104 respectively. Each analog signal conditioner is essentially a linear analog amplifier having gain control (and ideally filtering) capabilities, which are externally controllable by voltage control signals 110 and 111 for X-channel and Y-channel respectively. The function of the analog signal conditioners 101 and 102 are to scale the analog input signals in accordance with instructions encoded onto voltage control signals 110 and 111. In contrast, the function of the A/D converters 103 and 104 are to digitize the scaled analog input signals by (1) first sampling the analog input signals, $A_1 S_p(t)$ and $A_2 S_d(t)$, at a sampling rate $T_s$, to produce $A_1 S_p(kT_s)$ and $A_2 S_d(kT_s)$ respectively; and (2) thereafter to quantize the discrete samples of such discrete data sequences to a standard level; and (3) to assign to such discrete samples, a binary number. During the sampling and conversion process, the digital number sequences from both the X and Y channels (e.g., $N(x_1), N(x_2), \ldots N(x_k) \ldots, N(x_M)$ and $N(y_1), N(y_2) \ldots, N(y_k) \ldots, N(y_M)$ where $N(x_k)$ and $N(y_k)$ can be a logic "1" or a logic "0" level) are stored in RAM data memory within microcomputer 10.

The central programming unit 3 also includes the digital microcomputer 10, and a plurality of interface devices to be discussed more fully in a subsequent section. The digital microcomputer 10 can be a single-chip microcomputer containing a versatile central processing unit (C.P.U.), a program memory (ROM), a data memory (RAM), an oscillator and clock circuits, and a flexible input/output (I/O) structure.

In FIG. 6, the representation of the digital microcomputer 10 while in block form, nevertheless represents the various subunits of a single-chip microcomputer, which consists of functional sections such as (1) internal control that coordinates and executes the sequence of events for an instruction; (2) arithmetic logic units; (3) special register and address arithmetic units; (4) memories; and (5) I/O circuits.

The digitized data sequences $S_p(N_k)$ and $S_d(N_k)$, referred to herein as $X_M = (x_1, x_2 \ldots, x_M)$ and $Y_M = (y_1, y_2 \ldots y_M)$ respectively, are fed into RAM data memory of the digital microcomputer 10, as they are being generated from the A/D converters 103 and 104.

Since the digital microcomputer was conceived for use mainly as a controller and thus has been designed with a flexible I/O structure, control and data signals from the various electrical and mechanical devices used in the test instrument system 1 hereof are connected to the I/O patch ports of the microcomputer 10 through the necessary interface units, designated by $I_1$, $I_2$, $I_3$, $I_4$, $I_5$, $I_6$, $I_7$, $I_8$, $I_9$, $I_{10}$, and $I_{11}$.

Control signals 105, 106, and 107 from the microcomputer 10 are connected to the first, second, and third solenoid control valves 94, 97, and 99, respectively, through interface unit $I_1$. The transduced pressure signal 108 from the pressure sensor 95 in the small holding tank 94 is connected to the microcomputer 10 through interface unit $I_2$, which would be an A/D converter. Power on/off control signal 109 from microcomputer 10 is connected to vacuum pump 91 through interface unit $I_3$. Linear analog amplifier control signals 110 and 111 from the microcomputer 10, are connected to the linear analog amplifiers 101 and 102 respectively through interface unit $I_4$. Sampler control signals 112 and 113 from microcomputer 10 are connected to samplers 18 and 21 respectively through interface unit $I_5$. Position sensor control signals 114 from microcomputer 10, are connected to position sensor translator 115 through interface unit $I_6$. And digital data sequences, $X_M$ and $Y_M$ from A/D converters 103 and 104 respectively, are transmitted to the microcomputer 10 through interface unit $I_7$.

Reference is now given to the third component in the test instrument system 1 hereof, namely the operator's console unit 4 which includes in the preferred embodiment hereof, a cathode ray tube (CRT) visual display unit 120 on which X-Y point plots, alphanumeric characters, and graphic or pictorial views may be displayed. The operator's console also includes an alphanumeric keyboard unit 121 for writing instructions or entering data, a front-panel mounted function selector unit 122 for making inquiries or selecting operating modes, and a printer unit 123 for producing tangible copies of x-y point plots, alphanumeric characters, and graphic or pictorial views. The keyboard unit 121 is provided for setting system parameters, e.g. acceptable coefficient of correlation values, threshold pressure values, Go/-NoGo limits, sampling intervals $T_s$ (in milliseconds), test cycle interval T (in seconds), gain of linear analog amplifiers 101 and 102, and other parameters as may be desired. The function selector unit 122 includes a start switch, reset/abort switch, vacuum profile switch, display/regression switch, transducer calibrate switch, and printer data-form feed switch.

The plurality of digital signals 124 from microcomputer 10 are transmitted to the CRT display unit 120 through interface unit $I_8$. The plurality of digitally encoded signals 125 from alphanumeric keyboard 121 are connected to the microcomputer 10 through interface unit $I_9$. The plurality of digital signals 126 from the function selector unit 122 are transmitted to the microcomputer 10 through interface unit $I_{10}$, and the plurality of digital signals 127 from the microcomputer 10 are transmitted to the printer unit 123 through interface unit $I_{11}$. All such interface units $I_1$ through $I_{11}$ as functionally described above, are well-known in the art to which the present invention pertains, and need not be given further attention herein.

At this juncture, it is appropriate to note that the method of testing the hermetic seal integrity of packages of the present invention, has been realized within the test instrument system 1 illustrated in FIG. 6 and described above. Moreover, the method of the present invention has been realized as an embodiment of a computer program for a package tester, expressed in PLM-80 computer language, but could have been embodied in structurally different programs expressed in different languages without deviating from the scope and spirit of the present invention. Furthermore, the method of the present invention could also have been realized utilizing analog and digital circuitry and analog and digital signal processing therein, as well.

OPERATION OF TEST INSTRUMENT SYSTEM HEREOF

The operation of the test instrument system 1 hereof is now given, with reference made to FIGS. 5A and 5B showing the preferred and alternative embodiment of the test chamber hereof respectively.

To place a test package 6 in the test chamber 5' in FIG. 5A, for purposes of testing, the following procedure is executed by operator. The front panel 33 is opened outward, which allows the second linear member 53 to swing upward as the counterweight 54 pivots downward about spindle 55. This cantilever principled action results in upward translation of the position sensor 7, up and away from test tray 37 and insert 38. A new test package 6 is then inserted into the cavity of the insert 38, and the front door 33 is thereafter pushed closed, resulting in second linear member 53 being pushed downward and counterweight 54 urged upward, with the lowering of the position sensor 7 into approximate contact with package 6, effected.

To place a test package 6 in the test chamber 5" of FIG. 5B, for purposes of testing, the following procedure is executed by operator. By operator's actuation of logic and control circuits (now shown), stepping motor 83 is energized as to translate vertically, the position sensor 7 and its test probe 12, above a safe range from test tray 88. Then, at the end of this cycle, stepping motor 65 is energized by the same logic and control circuits which results in the horizontal translation of platform follower 67 along guide bar (not shown), and the consequential horizontal translation of slidable test chamber drawer 62 beyond the front wall panel 86. Thereafter, a test package is inserted into the cavity 88 of a tray insert 63, and slidable test chamber drawer 62 is caused to slide back into the test chamber 5" by operator's actuation of stepping motor 65 in its reverse direction. Upon front drawer panel 61 engaging gasket 72 and front wall panel 86, the proper seals are formed therebetween, and stepping motor 83 is reenergized as to lower position sensor 7 as to just contact the flexible package surface.

Figure 8:
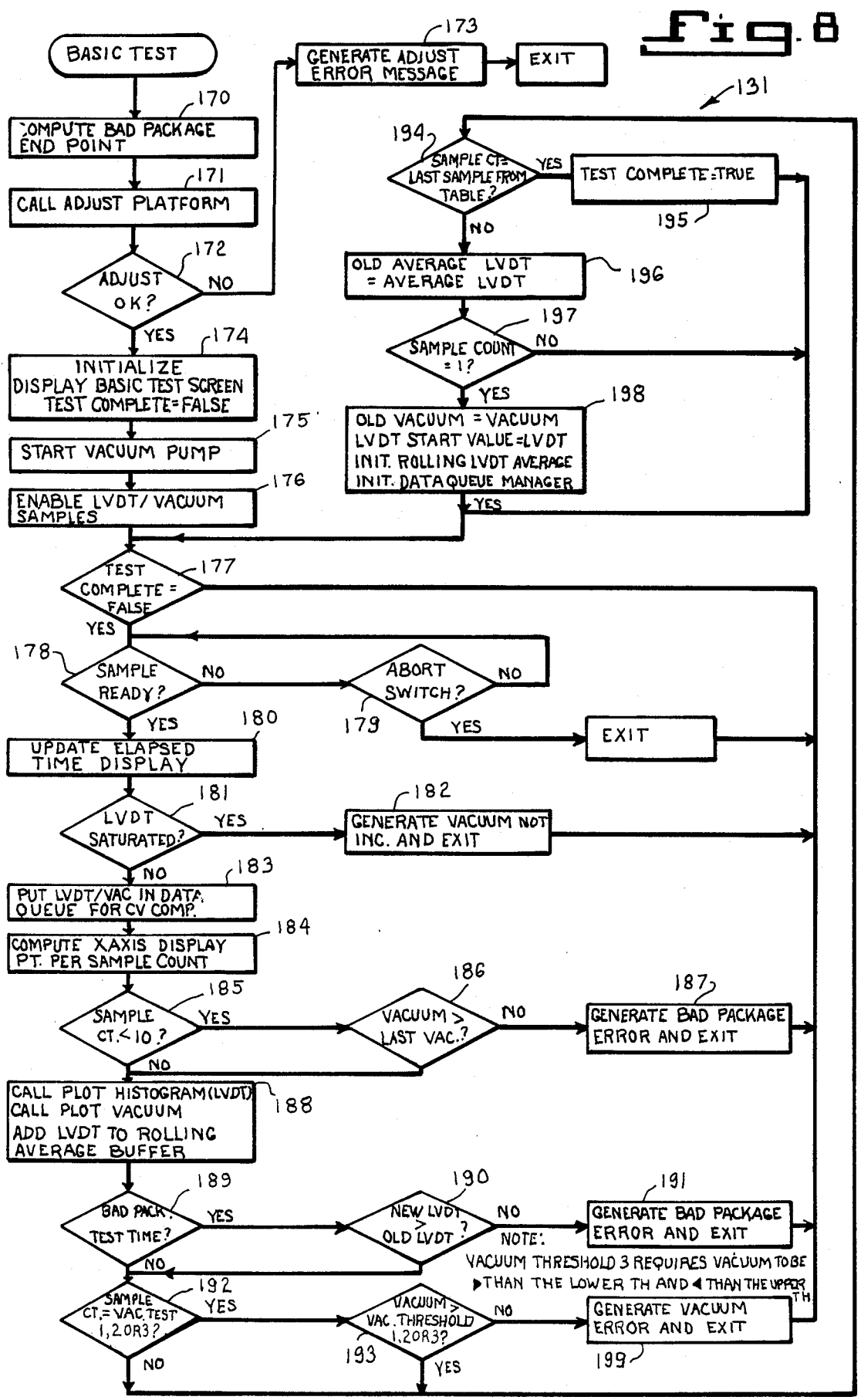
FIG. 8 is a high-level computer programming flow chart for the Basic Test Subprogram hereof which is nested within the Main Package Tester Program illustrated in FIG. 7.

Referring now to FIGS. 6, 7, 8, 9A and 9B, in particular, there is shown in FIG. 7, a high-level computer programming flow chart 130 of a Main Package Tester Program which is operable on the test instrument system 1 illustrated in FIG. 6. The computer programming flow chart 130 provides a graphical representation for the definition of a main program into which the method hereof has been embodied. In FIG. 8, there is shown a high-level computer programming flow chart of a Basic Test Subprogram 131 which is nested within the Main Package Tester Program, and is called into operation at a specific stage therein, as will be discussed hereinbelow.

Referring to FIG. 7, at the upper left hand corner thereof, the program commences at "Power On" block 132, and thereupon at block 133 institutes the initialization of the microcomputer system, including keyboard, printer, and other front panel mounted function selector switches.

As indicated by block 134, set gain procedures may be effected upon an action flag at block 135 being false. This procedure provides control over the gain of the analog signal generated by the LVDT-type position sensor 7, by means of a four-position gain switch on the function selector unit 122. This switch should be set at the highest amplification attainable without saturating the LVDT. Proper selection becomes apparent after performing a test on a representative sample of a sealed package. If a sample package is tested at too high an amplification, then the error message "LVDT Saturation—please reduce the gain" will appear on the screen of visual display unit 120. Operator should then turn the gain to the next lowest setting and rerun the test. Once within range, the program will then put up the "Ready Screen", as indicated at block 136.

Next, after the keyboard unit 120 is ready, as indicated at block 137, the menu key indicated at block 138, may be depressed whereupon the test parameters of the test instrument system 1 may be set, using a parameter set procedure indicated at block 139. This procedure provides for the setting of (1) vacuum thresholds which constitutes a test vacuum profile, (2) the sampling interval $T_s$ (in milliseconds), (3) the duration of the sample interval T (in seconds), (4) the number of dots displayed per sampling interval, and (5) the Go/NoGo correlation coefficient value. Once these parameters have been set, the operator may then select any one of the front-panel switches of the function selector, as indicated by blocks 140, 141, 142, 143, or 144.

At block 140, the Basic Test Subprogram of FIG. 8, may be selected and executed. If selected, the Basic Test Subprogram is called into operation at block 145, executed, and test results therefrom at block 146 classified with a case number as either Case O, Case 1, Case 2, Case 3, or Case 4, as indicated by blocks 147, 148, 149, 150, and, 151 respectively. Thereafter, the test result in terms of case number, is displayed on the CRT display unit, and if the printer unit 123 is enabled, then a hardcopy test result printout is generated therefrom. In the event that the test result is Case O, designating a "good test", then at block 152, the computed correlation value (C.V.) is compared with the preset Go/NoGo value. If the correlation value is greater than or equal to the preset value, then as indicated at block 153, a "Package Pass" message is displayed on the visual display screen; and if the computed correlation value is less than the preset Go/NoGo value, then as indicated at block 154, a "Package Fail" message is displayed on the visual display screen. In either event, as indicated at block 155, the correlation value and the vacuum pressure at the end of the test cycle, is displayed on the visual display unit 120, and if the printer unit 123 is enabled, then a printout of the test results is generated therefrom. At the end of the Main Package Tester Program, the action flag at block 156 is reset for a new test cycle to begin. In the event that test result is Case 1, designating a saturation error due to the core position sensor being too far in cylindrical transformer of the LVDT, then the visual display unit 120 will display "Saturation Error," and the printer unit 123 if enabled, will generate a printout indicating "no/test."

In the event that test result is Case 2, designating no expansion and hence a "bad package," the display display unit 120 will display "Bad Package," and the printer unit 123, if enabled, will generate a printout indicating "Package Failed." In the event that test result is Case 3, designating that "vacuum is not increasing," the visual display unit 120 will display "Vacuum Not Increasing Error," and the printer unit 123, if enabled, will generate a printout indicating "no test."

Lastly, in the event that the test result is Case 4, designating "vacuum out of range," the CRT display unit will display "Vacuum Range Error," and the printer unit, if enabled, will generate a printout indicating "no test."

At block 141, the printer unit 123 may be reset by depressing the Printer Form Feed (FF) switch, which resets the printer by advancing a new printer form therein, and printing the next test package number thereon.

At block 142, the reset/abort switch may be selected. This function will automatically remove the program from any "message screen," and bring the system back to "ready screen." Any additional test can only be executed from the ready screen. This switch will also abort any test in progress.

At block 143, the vacuum profile test procedure may be selected. This test procedure provides for the adjustment of the vacuum curve of the test chamber. When this switch is selected, the vacuum pump begins, and the vacuum pressure is plotted. In the preferred embodiment hereof, three vacuum pressure threshold values are plotted and numerically displayed. Any actual vacuum adjustments can be made via the vacuum relief valve 98. The results of any vacuum adjustments are immediately displayed on the visual display unit 120. If any of the threshold pressure values must be changed, they can be changed via the parameter set procedure at block 139, as discussed hereinabove.

At block 144, the regression analysis test procedure may be selected into operation. Upon the selection of this function, the measured and sampled expansion and vacuum sample points of the most previous test, will be graphically displayed, and a regression line compund in accordance with the principles of regression analysis, as discussed hereinbefore. Referring now to FIGS. 9A and 9B in particular, it is noted as discussed hereinbefore that at this stage of the Basic Test Program, optionally a segmental-type regression analysis of sampled package expansion data on sampled vacuum pressure data may be performed. As illustrated in FIG. 9B, such segmental-type regression analysis involves (i) segmenting the sampled vacuum pressure data into subintervals (e.g., I, II, III, IV, and V), (ii) computing the slopes (i.e., $b_1$, $b_2$, $b_3$, $b_4$, and $b_5$) of linear regression functions $F_I$, $F_{II}$, $F_{III}$, $F_{IV}$, and $F_V$, over these subintervals, and (iii) comparing the slopes of adjacent linear regression functions as to determine at what values of vacuum pressure dependence of package expansion on vacuum pressure begins to decrease, and so too, the hermetic seal integrity of the test package.

Expressed in terms of a computational procedure, the segmental-type regression analysis of sampled package expansion data on sampled vacuum pressure data, involves the following steps: (i) producing a first discrete data sequence proportional to the pressure within the test chamber, and producing a second discrete data sequence proportional to the displacement of the semiflexible surface of a test package; (ii) segmenting both first and second discrete data sequences into equal and corresponding subsequences; (iii) computing the regression coefficients (i.e., slope and y intercepts) of linear regression functions over each subinterval; (iv) and comparing the regression coefficients of adjacent linear regression functions, as to determine at what values of vacuum pressure, the dependence of package expansion on vacuum pressure decreases, and so too, the hermetic seal integrity of the test package. Also at this state, the regression analysis data, such as the regression coefficients (e.g., scope and Y intercept) of the linear regression functions, will also be displayed. However, if the test was aborted, then for test interval and subintervals alike, no correlation data will be available, and the error message "no active regression information exists" will be displayed.

Referring now to FIG. 8, the computer programming flow chart for the Basic Test Subprogram is shown. Notably, this subprogram is called into operation at block 145 of FIG. 7. At block 170 of FIG. 8, the Basic Test subprogram first performs a test to determine whether the flexible surface of test package is within the dynamic range of the test probe 12 of the LVDT position sensor 7. If it is not, then the Basic Test subprogram calls an adjust platform procedure indicated at block 171, to bring the probe 12 within such operating limits. If platform adjustment is inadequate, then as indicated at block 173, an "adjustment error" message is generated on the visual display unit 120, and Basic Test Subprogram is exited. If platform adjustment is adequate, then as indicated at Block 174, the Basic Test subprogram initializes the microcomputer system 10, and displays on the visual display unit that "Basic Test Complete—False," as indicated at block 173.

Next, at block 175, the vacuum pump 91 receives electrical power on instruction from the microcomputer 10. The vacuum pump 91 will thereupon evacuate the large holding tank 92 while solenoid valve 94 remains closed. This permits the vacuum pump 91 to run continuously and store a large volume reservoir of vacuum without evacuating the small holding tank 93. Meanwhile, solenoid valve 97 is closed and 99 opened, thereby permitting ambient pressure to enter the test chamber 5. The microcomputer 10 will then close solenoid valve 99, and seal off port 98. It will then open solenoid valve 94 to permit the small holding tank 93 to be charged to the proper operator programming test pressure. The small holding tank 93 will become increasingly evacuated until the pressure sensor 95 instructs the microcomputer 10 that the proper pressure has been reached within the small holding tank 93. At that point, solenoid valve 94 will be closed by the microcomputer 10 and solenoid valve 97 will be opened to begin the evacuation of the test chamber 5. During the evacuation of the test chamber, pressure sensor 8 will continuously monitor the instantaneous interval pressure of the test chamber 5, as hereinbefore described The first analog data signal $S_p(t)$ proportional to the pressure within the test chamber, and the second analog data signal $S_d(t)$ proportional to the displacement (i.e. expansion) of the flexible surface of test package 6, are both then suspplied to the x and y channels respectively, of the signal preprocessor 100, illustrated in FIGS. 4 and 6. The first and second analog data signal, $S_p(t)$ and $S_d(t)$, respectively, are scaled by their respective linear analog amplifier 101 and 102. Then $S_p(t)$ and $S_d(t)$ are sampled at the sampling rate $T_s$, by samplers 18 and 21 respectively, to produce $S_p(KT_s)$ and $S_d(KT_s)$, respectively: $S_pKT_s)$ and $S_d(KT_s)$ quantized and assigned binary representations by digitizers 19 and 22 respectively, to produce the first and second discrete data sequences, $S_p(N_k)$ and $S_d(N_k)$, respectively. This above-described signal conditioning and A/D conversion process is enabled at block 176. As indicated by blocks 177, 178, and 179, the sampling process continues during the preset test cycle interval T, and the elapsed time thereof is displayed on the visual display unit 120 as indicated at block 180.

Upon reaching block 177 in the Basic Test Subprogram, it is noted that the microcomputer 10 logically traverses through a logic loop for each discrete data value sampled, involving the passing through blocks 178, 180, 181, 183, 185, 186, 188, 189, 190, 192, 193, 194, 196, 197, 198, and back to block 177, for each sample value.

At block 177, the Basic Test Subprogram determines whether test is complete by counting the number of sample values passing through the logical steps in the logic loop, with block 194 determining whether the next sample valve pair $(x_k, y_k)$ is ready for processing in the logic loop.

As indicated by block 180, the elapsed time of the Basic Test is updated and displayed upon the screen of the visual display unit 120 upon the processing of a new data sample pair $(x_k, y_k)$. Also, as indicated at block 181, during each pass in the logic loop, the LVDT-type position sensor 7 is tested for being in a state of saturation. If it is, then as indicated at block 182, a "Saturation Error" message is displayed on the visual display unit 120, and the Basic Test Subprogram is exited, as reliable measurements of probe position cannot be made while the LVDT position sensor 7 is saturated. As indicated at block 183, as each successive vacuum pressure and package expansion data point pair is sampled and converted to a digital numeral, each subsequently is put in its respective data queue (i.e., memory storage), for purposes of subsequent correlation value computation, and/or regression analysis. As indicated at block 184, the count regarding the number of X-axis display points per vacuum sample, is computed during each cycle of the logic loop, in accordance with a preset formula, e.g., 2 vacuum sample points per vacuum display point.

To determine whether the vacuum is continuously increasing, the Vacuum Continuous Increase Procedure is executed for sample counts less than 10, which is equal to the first 5 seconds of a 30 second test cycle, with a maximum number of M=60 vacuum sample points taken. Such a procedure is indicated by blocks 185 and 186, and if the vacuum pressure is determined not to be continuously increasing during the first 5 seconds thereof, then as indicated at block 187, a "Vacuum Not Increasing message" is generated on the visual display unit 120, and the Basic Test Subprogram is exited.

As indicated at block 188, the Basic Test Subprogram calls "Plot Histogram (LVDT) and Plot Vacuum" procedures, in order to graphically plot, continuously, the package expansion and vacuum pressure curves respectively on the visual display unit 120, with each new data value sampled.

To determine whether the package is continuously expanding throughout the duration of a test cycle, the test procedure indicated at blocks 189 and 190 is performed. As indicated at block 190, continuous test package expansion is tested over a certain part of the test cycle, such as the first 20 sample data points, over a M=60 sample test cycle having a test interval of 30 seconds. This test procedure involves comparing the present package expansion sample value from the LVDT position sensor 7, against the "rolling average"

of the last five or so package expansion sample values stored in a rolling average buffer memory. If the new package expansion sample value does not exceed the rolling average sample value, then as indicated at blocks 190 and 191, a "Bad Package" error message is generated and displayed on the visual display unit 120, and the Basic Test Subprogram is exited.

As indicated at blocks 192 and 193, the vacuum pressure curve of the test chamber is compared against three preset threshold pressure valves at preselected vacuum pressure test points. This is to ensure that the test cycle is conducted under controlled pressure conditions for purposes of generating meaningful comparative data for a family of packages. As indicated by blocks 192 and 193, the vacuum pressure sample values at three predetermined vacuum test points are compared against the three corresponding vacuum pressure threshold values. If any one of the three vacuum test samples does not exceed its corresponding vacuum pressure threshold value, then as indicated at blocks 193 and 199, a "vacuum error" message will be generated and displayed on the visual display unit 120 and the Basic Test Subprogram is exited.

As indicated at blocks 194 and 195, upon receipt of last test sample value pair from, RAM data memory in the microcomputer 10, the test is completed and the Basic Test Subprogram is exited. If, however, the last sample value pair has not been reached in the test cycle, then as indicated at block 196, the old average package expansion samples are updated by recalculating a "rolling average". The primary purpose of this averaging operation is to provide a smoothing function, as to eliminate transient spikes which may appear at the output of the LVDT-type position sensor 7 and effect the package expansion data sample values.

Also, as indicated at block 197, if the first data sample pair is being processed, then, as indicated at block 198, the present vacuum sample value is substituted for the last vacuum sample value, for purpose of increasing vacuum test procedure during next traverse through the logic loop, indicated at block 186. Also, as indicated at block 198, the initial value of the LVDT position sensor 7 is the initial value of the rolling average of the expansion data samples. If, however, the first data sample pair $(x_1, y_1)$ is not being processed, then return to the beginning of logic loop at block 177, occurs.

Upon the processing of the last data sample pair $(x_{60}, y_{60})$ for a M=60 sample test cycle, the microcomputer 10 will instruct solenoid 97 to close, and solenoid 99 to open, thereby allowing the vacuum pressure in test chamber to decrease to ambient pressure levels. Thereupon, the Basic Test Subprogram is exited and the Main Package Tester Program resumes its operation as described hereinbefore.

In the absence of an exit of the Basic Test Subprogram as a result of (i) failure of increasing vacuum, (ii) failure of increasing package expansion, (iii) detection of saturation of the LVDT position sensor 7, or (iv) failure of vacuum test samples to match the preset vacuum pressure threshold values, the correlation estimate at block 152 in FIG. 7 will then be computed in accordance with the formulation described hereinbefore.

Further modification of the present invention herein disclosed, will occur to persons skilled in the art to which the present invention pertains, and all such modifications are deemed to be within the scope and spirit of the present invention defined by the appended claims.

What is claimed is:

1. A method of testing a package or container for hermetic seal integrity, which comprises the sequence of steps:

placing within a test chamber, a sealed test package with at least one semi-flexible surface;

gradually changing the pressure within said test chamber from a first value to a second value, over the time interval of a test cycle, measuring, during said time interval of said test cycle, both the pressure within said test chamber and the displacement of said semi-flexible surface of said sealed test package, and producing during said time interval of said test cycle, a first analog data signal proportional to the pressure within said test chamber, and a second analog data signal proportional to the displacement of said semi-flexible surface of said sealed test package, wherein said first analog data signal is converted to a first discrete data sequence proportional to the pressure within said test chamber thereover, and wherein said second analog data signal is converted to a second discrete data sequence proportional to the displacement of said semi-flexible surface of said sealed test package thereover; and computing a correlation estimate from said first discrete data sequence and said second discrete data sequence, so as to provide a measure of hermetic seal integrity of said sealed test package.

2. A method of testing a package or container for hermetic seal integrity according to claim 1, wherein said correlation estimate is a correlation coefficient computed from said first discrete data sequence and said second discrete data sequence.

3. A method of testing a package or container for hermetic seal integrity according to claim 2, wherein said correlation estimate is a correlation coefficient computed by subjecting said first discrete data sequence and said second discrete data sequence to statistical analysis, so to provide a measure of hermetic seal integrity of said testing package.

4. A method of testing a package or container for hermetic seal integrity according to claim 2, wherein said correlation coefficient value is computed in accordance with the following formula:

$$\frac{\sum_{i=1}^{i=M}(x_i - \bar{x})(y_i - \bar{y})}{\left[\sum_{i=1}^{i=M}(x_i - \bar{x})^2 \sum_{i=M}^{i=M}(y_i - \bar{y})^2\right]^{\frac{1}{2}}}$$

wherein $x_i$ for $1 \leq i \leq M$ represents said first discrete data sequence, and $y_i$ for $1 \leq i \leq M$ represents said second discrete data sequence, and $\bar{x}$ and $\bar{y}$ represents the mean value of $x_i$ and $y_i$ respectively.

5. A method of testing a package or container for hermetic seal integrity according to claim 2, wherein said correlation coefficient value is computer in accordance with the following formula:

$$\frac{\left[M\sum_{k=1}^{k=M} x_k y_k\right] - \left[\sum_{k=1}^{k=M} x_k \cdot \sum_{k=1}^{k=M} y_k\right]}{\left[\left[\left[M\sum_{k=1}^{k=M} x_k^2\right] - \left[\sum_{k=1}^{k=M} x_k\right]^2\right] \cdot \left[M\sum_{k=1}^{k=M} y_k^2 - \left[\sum_{k=1}^{k=M} y_k\right]^2\right]\right]^{\frac{1}{2}}}$$

10 wherein $x_k$ for $1 \leq k \leq M$ represents said first discrete data sequence, and $y_k$ for $1 \leq k \leq M$ represents said second discrete data sequence.

6. A method of testing a package or container according to claim 1 wherein a regression function is computed from said first and second discrete data sequences in accordance with the principles of regression analysis, and said regression function is graphically plotted against said first and said second discrete data sequences, as to provide a visual indication of the dependency of said second discrete data sequence on said first discrete data sequence.

7. A method of testing a package or container for hermetic seal integrity according to claim 1, wherein said first value of pressure within said test chamber is greater than said second value thereof, thereby causing, during said time interval of said test cycle, the space within said test chamber to approach vacuum conditions, and said displacement of said semi-flexible surface of said sealed test package resulting in an expansion thereof.

8. A method of testing a package or container for hermetic seal integrity according to claim 7, wherein, during the earlier phases of said step of measuring both the pressure of the test chamber and the displacement of said semi-flexible surface of said sealed test package, said method includes
analyzing the second discrete data sequence for a continuous expansion of said semi-flexible surface of said test package; and
upon detection of a failure of said continuous expansion thereof, terminating said test cycle.

9. A method of testing a package or container for hermetic seal integrity according to claim 7, wherein, during the earlier phases of said interval of said test cycle, said method includes
analyzing said first discrete data sequence for continuous decrease of pressure within said test chamber, and
upon detection of a failure of said continuous decrease thereof, terminating said test cycle as an indication that said test cycle is not being operated under controlled pressure conditions.

10. A method of testing a package or container for hermetic seal integrity according to claim 1, wherein during said interval of said test cycle, said method comprises analyzing said first discrete data sequence for operation of said test chamber under controlled pressure conditions, during said test cycle.

11. A method of testing a package or container for hermetic seal integrity according to claim 10, wherein said analyzing of said first discrete data sequence for operation of said test chamber under controlled pressure conditions, is achieved by
comparing a plurality of predefined threshold pressure values with corresponding values of said first discrete data sequence, and
upon the occurrence of one of said corresponding values of said first discrete data sequence not equalling said corresponding predefined threshold pressure values, terminating said test cycle as an indication that said test cycle is not being operated under controlled pressure conditions.

12. Apparatus for testing a package or container for hermetic seal integrity, which comprises:
a test chamber into which a sealed test package having at least one semi-flexible surface, may be received;
means for changing the pressure in said test chamber, from a first value to a second value, during the interval of a test cycle;
means for measuring the pressure therein during said interval, and producing a first analog data signal proportional thereto;
means within said test chamber for measuring the displacement of said semi-flexible surface during said interval, and producing a second analog data signal proportional thereto;
means for sampling each of said first and second analog data signals during said interval of said test cycle, to produce a first discrete data sequence and said second discrete data sequence, so as to provide a measure of hermetic seal integrity of said sealed test package.

13. Apparatus for testing a package or container for hermetic seal integrity according to claim 12, wherein said correlation estimate is a correlation coefficient computed from said first discrete data sequence and said second discrete data sequence, so as to provide a statistical measure of a hermetic seal integrity of said sealed test package.

14. Apparatus for testing a package or container for hermetic seal integrity according to claim 13, wherein said correlation coefficient is computed in accordance with the following formula $$\frac{\sum_{i=1}^{i=M}(x_i - \bar{x})(y_i - \bar{y})}{\left[\sum_{i=1}^{i=M}(x_i - \bar{x})^2 \sum_{i=1}^{i=M}(y_i - \bar{y})^2\right]^{\frac{1}{2}}}$$

wherein $x_i$ for $1 \leq i \leq M$ represents said first discrete data sequence, and $y_i$ for $1 \leq i \leq M$ represents said second discrete sequence, and x and y represent the mean value of $X_i$ and $Y_i$, respectively.

15. Apparatus for testing a package or container for hermetic seal integrity according to claim 13, wherein said correlation coefficient is computed in accordance with the following formula $$\frac{\left[M\sum_{k=1}^{k=M} x_k y_k\right] - \left[\sum_{k=1}^{k=M} x_k \cdot \sum_{k=1}^{k=M} y_k\right]}{\left[\left[\left[M\sum_{k=1}^{k=M} x_k^2 - \left[\sum_{k=1}^{k=M} x_k\right]^2\right] \cdot \left[M\sum_{k=1}^{k=M} y_k^2 - \left[\sum_{k=1}^{k=M} y_k\right]^2\right]\right]^{\frac{1}{2}}}$$

wherein $x_k$ for $1 \leq k \leq M$ represents said first discrete data sequence, and $y_k$ for $1 \leq k \leq M$ represents said second discrete data sequence.

16. Apparatus for testing a package or container for hermetic seal integrity, according to claim 12, wherein, said test chamber comprises
   an enclosure having a base, walls, a top panel, and a hinged door having an open position and a closed position; and
   a cantilever-principled mechanism for adjustment of said means for measuring said displacement relative to said semi-flexible surface, in response to opening and closing said hinged door, said means for measuring said displacement being lowered into position above said semi-flexible surface when said hinged door is in said closed position, and said means for measuring said displacement being elevated substantially above said semi-flexible surface when said hinged door is in said open position.

17. Apparatus for testing a package or container for hermetic integrity, according to claim 12, wherein said test chamber comprises
   an enclosure having a base, walls, a top panel, and a front drawer panel;
   a slidable drawer attached to said front drawer panel; and
   a horizontal translation device whereto said slidable drawer is attached, and wherealong said slidable drawer travels, as to allow external insertion of said test package thereinto, and internal positioning of said means for measuring said displacement, relative to said semi-flexible surface of said test package.

18. Apparatus for testing a package or container for hermetic seal integrity according to claim 12, wherein said means for continuously measuring the displacement of said semi-flexible surface comprises
   a linear variable differential transformer having a cylindrical coil and a core rod; and
   a test probe attached to one end of said core rod.

19. Apparatus for testing a package or container for hermetic seal integrity, according to claim 14, wherein said means for measuring displacement of said semi-flexible surface, is a position sensor having a probe.

20. Apparatus for testing a package or container for hermetic seal integrity, according to claim 19 wherein said test chamber comprises;
   an enclosure having a base, walls, a top panel, and a hinged door having an open position and a closed position;
   a position sensor positioning mechanism having a means for course position adjustment of said probe relative to said semi-flexible surface; and
   a means for fine position adjustment of said probe relative to said semi-flexible surface.

21. Apparatus for testing a package or container for hermetic seal integrity according to claim 20, wherein said means for course position adjustment comprises
   a cantilever-principled mechanism for adjustment of said probe relative to said semi-flexible surface, in response to opening and closing said hinged door, said position sensor being lowered into position above said semi-flexible surface when said hinged door is in said closed position, and said means for measuring said displacement being elevated substantially above said semi-flexible surface when said hinged door is in said open position.

22. Apparatus for testing a package or container for hermetic seal integrity according to claim 20, wherein said means for fine position adjustment is a vertical platform translator comprising
   a platform to which said position sensor is attached and from which said position sensor is vertically disposed; and
   an elevator mechanism to which said platform is attached, and with which said position sensor can be vertically translated in upward and downward directions with a high degree of precision and control.

23. Apparatus for testing a package or container for hermetic seal integrity according to claim 22, wherein said elevator mechanism comprises
   a fixture supporting a lead screw;
   a platform follower movable along said lead screw; and to which said position sensor is mounted; and
   a stepping motor connected to said lead screw, and rotatable in response to a fine position control signal, to provide fine probe position adjustment of said position sensor.

24. Apparatus for testing a package or container for hermetic seal integrity, which comprises:
   a test chamber into which a sealed test package having at least one semi-flexible surface, may be received;
   means for changing the pressure in said test chamber, from a first value to a second value, during the interval of a test cycle;
   means for measuring the pressure therein during said interval, and producing a first analog data signal proportional thereto;
   means within said test chamber for measuring the displacement of said semi-flexible surface during said interval, and producing a second analog data signal thereto;
   means for sampling each of said first and second analog data signals during said interval, to produce a first discrete data sequence and a second discrete data sequence therefrom respectively;
   means for computing at least one regression function from said first discrete data sequence and said second discrete data sequence, in accordance with the principles of linear regression analysis; and
   means for plotting and visually displaying said regression function against said first and second discrete data sequences, as to provide a visual indication of the statistical dependency of said second discrete data sequence on said first discrete data sequence, and at what values of test chamber pressure venting of said test package occurs.

25. Apparatus for testing a package or container for hermetic seal integrity according to claim 24, wherein said regression function is of the form $$y_i - E_y(x_i) = a + bx_i$$

wherein $E_y(x_i)$ is the conditional expectation of y given x, and a and b are regression coefficients computed from the following formulas $$a = \frac{1}{M} \sum_{i=M}^{i=M} y_i - b \sum_{i=1}^{i=M} x_i$$

$$b = \frac{\sum_{i=1}^{i=M}(x_i - \bar{x})(y_i - \bar{y})}{\sum_{i=1}^{i=M}(x_i - \bar{x})^2}$$

wherein $\bar{x}$ and $\bar{y}$ are the mean values of x and y respectively.

26. A method of testing physical properties of a mechanical system characterizable by at least a first variable and a second variable, at least one of which is a random variable, which comprises the sequence of steps:

observing, during the time interval of a test cycle, a system characterizable by at least a first variable and a second variable, at least one of which is a random variable;

measuring, during said time interval of said test cycle, both said first variable and said second variable of said mechanical system, and producing during said time interval of said test cycle, a first analog data signal proportional to instantaneous value of said first variable and a second analog data signal proportional to instantaneous value of said second variable, wherein said first analog data signal is converted to a first discrete data sequence porportional to said instantaneous value of said first variable, and wherein said second analog data signal is converted to a second discrete data sequence proportional to said instantaneous value of said second variable; and computing a correlation estimate from said first discrete data sequence and said second discrete data sequence, so as to provide a measure of physical properties of said mechanical system.

27. A method of testing physical properties of a mechanical system according to claim 25, wherein said correlation estimate is a correlation coefficient computed from said first discrete data sequence and said second discrete data sequence.

28. A method of testing physical properties of a mechanical system according to claim 27, wherein said correlation estimate is a correlation coefficient computed by subjecting said first discrete data sequence and second discrete data sequence to statistical analysis, so to provide a statistical measure of physical properties of said mechanical system.

29. A method of testing physical properties of a mechanical system according to claim 27, wherein said correlation coefficient is computed in accordance with the following formula $$\frac{\sum_{i=1}^{i=M}(x_i - \bar{x})(y_i - \bar{y})}{\left[\sum_{i=1}^{i=M}(x_i - \bar{x})^2 \sum_{i=1}^{i=M}(y_i - \bar{y})^2\right]^{\frac{1}{2}}}$$

wherein $x_i$ for $1 \leq i \leq M$ represents said first discrete data sequence, and $y_i$ for $1 \leq i \leq M$ represents said second discrete data sequence, and $\bar{x}$ and $\bar{y}$ represents the mean value of $x_i$ and $y_i$ respectively.

30. A method of testing physical properties of a system according to claim 27, wherein said correlation coefficient is computed in accordance with the following formula $$\frac{\left[M \sum_{k=1}^{k=M} x_k y_k\right] - \left[\sum_{k=1}^{k=M} x_k \cdot \sum_{k=1}^{k=M} y_k\right]}{\left[\left[\left[M \sum_{k=1}^{k=M} x_k^2\right] - \left[\sum_{k=1}^{k=M} x_k\right]^2\right] \cdot \left[M \sum_{k=1}^{k=M} y_k^2 - \left[\sum_{k=1}^{k=M} y_k\right]^2\right]\right]^{\frac{1}{2}}}$$

wherein $x_k$ for $1 \leq k \leq M$ represents said first discrete data sequence, and $y_k$ for $1 \leq k \leq M$ represents said second discrete data sequence.

31. A method of testing physical properties of a physical system according to claim 26 wherein a regression function is computed from said first and second discrete data sequences in accordance with the principles of regression analysis, and said regression function is graphically plotted against said first and said second discrete data sequences, as to provide a visual indication of the dependency of said second discrete data sequence on said first discrete data sequence.

32. Apparatus for testing physical properties of a mechanical system characterizable by at least a first variable and a second variable, at least one of which is a random variable, which comprises:

means for rendering observable during the time interval of a test cycle, a mechanical system characterizable by at least a first variable and a second variable, where at least one of which is a random variable;

means for measuring said first variable, during said time interval of said test cycle, and producing a first analog data signal proportional thereto;

means for measuring said second variable, during said time interval of said test cycle, and producing a second analog data signal proportional thereto;

means for sampling each of the said first and second analog data signals during said interval of said test cycle, to produce a first discrete data sequence and a second discrete data sequence, respectively; and means for computing a correlation estimate from said first discrete data sequence and said second discrete data sequence, so as to provide a measure of physical properties of said mechanical system.

33. Apparatus for testing physical properties of a mechanical system according to claim 32, wherein said correlation estimate is a correlation coefficient computed from said first discrete data sequence and said second discrete data sequence, so as to provide a statistical measure of hermetic seal integrity of said sealed test package.

34. Apparatus for testing physical properties of a mechanical system according to claim 33, wherein said correlation estimate is a correlation coefficient computed in accordance with the following formula $$\frac{\sum\limits_{i=1}^{i=M}(x_i-\bar{x})(y_i-\bar{y})}{\left[\sum\limits_{i=1}^{i=M}(x_i-\bar{x})^2 \sum\limits_{i=1}^{i=M}(y_i-\bar{y})^2\right]^{\frac{1}{2}}}$$

wherein $x_i$ for $1 \leq i \leq M$ represents said first discrete data sequence, and $y_i$ for $1 \leq i \leq M$ represents said second discrete data sequence, and $\bar{x}$ and $\bar{y}$ represents the mean value of $x_i$ and $y_i$ respectively.

35. Apparatus for testing physical properties of a mechanical system according to claim 33, wherein said correlation coefficient is computed in accordance with the following formula $$\frac{\left[M\sum\limits_{k=1}^{k=M}x_k y_k\right] - \left[\sum\limits_{k=1}^{k=M}x_k \cdot \sum\limits_{k=1}^{k=M}y_k\right]}{\left[\left[\left[M\sum\limits_{k=1}^{k=M}x_k^2\right]-\left[\sum\limits_{k=1}^{k=M}x_k\right]^2\right]\cdot\left[M\sum\limits_{k=1}^{k=M}y_k^2-\left[\sum\limits_{k=1}^{k=M}y_k\right]^2\right]\right]^{\frac{1}{2}}}$$

wherein $x_i$ for $1 \leq i \leq M$ represents said first discrete data sequence, and $y_i$ for $1 \leq i \leq M$ represents said second discrete data sequence.

36. Apparatus for testing physical properties of a mechanical system characterizable by at least a first variable and a second variable, at least one of which is a random variable, which comprises:
   means for rendering observable during the time interval of a test cycle, a mechanical system characterizable by at least a first variable and a second variable, where at least one of which is a random variable;
   means for measuring said first variable, during said time interval of said test cycle, and producing a first data signal proportional thereto;
   means for measuring said second variable, during said time interval of said test cycle, and producing a second data signal proportional thereto;
   means for sampling each of said first and second data signals during said interval, to produce a first discrete data sequence and a second discrete data sequence therefrom respectively;
   means for computing at least one regression function from said first discrete data sequence and said second discrete data sequence, in accordance with the principles of regression analysis; and
   means for plotting and visually displaying said regression function against said first and second discrete data sequences, as to provide a visual indication of the statistical dependency of said second discrete data sequence on said first discrete data sequence, and at what values of test chamber pressure venting of said test package occurs.

37. Apparatus for testing physical properties of a mechanical system according to claim 36, wherein said regression function is of the form $$y_i = E_y(x_i) = a + b\, x_i$$

wherein $E_y(x_i)$ is the conditional expectation of y given x, and a and b are regression coefficients computed from the following formulas $$a = \frac{1}{M}\sum\limits_{i=M}^{i=M}y_i - b \sum\limits_{i=1}^{i=M}x_i$$

$$b = \frac{\sum\limits_{i=1}^{i=M}(x_i-x)(y_i-y)}{\sum\limits_{i=1}^{i=M}(x_i-x)^2}$$

wherein x and y are the mean values of x and y respectively.

38. A method of testing a package or container for hermetic seal integrity, which comprises the sequence of steps:
   placing within a test chamber, a sealed test package with at least one semi-flexible surface;
   gradually changing the pressure within said test chamber from a first value to a second value, over the time interval of a test cycle,
   measuring, during said time interval of said test cycle, both the pressure within said test chamber and the displacement of said semi-flexible surface of said sealed test package, and
   producing during said time interval of said test cycle, a first analog data signal proportional to the pressure within said test chamber, and a second analog data signal proportional to the displacement of said semi-flexible surface of said sealed test package;
   converting said first analog data signal into a first discrete data sequence proportional to the pressure within said test chamber, and
   converting said second analog data signal into a second discrete data sequence proportional to the displacement of said semi-flexible surface of said sealed test package; and
   performing a segmental-type regression analysis of said second discrete data sequence on said first discrete data sequence including,
   segmenting said first discrete data sequence into a first plurality of subsequences and
   segmenting second discrete data sequence into a second plurality of subsequences, each said subsequence of said first plurality thereof corresponding to a subsequence of said second plurality thereof and being of equal length,
   computing at least one regression coefficient of a linear regression function for each corresponding first and second subsequences, and
   comparing said regression coefficients of adjacent linear regression functions for said corresponding first and second subsequences, as to determine at what values of vacuum pressure, the dependence of package displacement on vacuum pressure decreases, and thereby provide therefrom a measure of hermetic seal integrity of said test package.

* * * * *

UNITED STATES PATENT AND TRADEMARK OFFICE
CERTIFICATE OF CORRECTION

PATENT NO. : 4,771,630

DATED : September 20, 1988

INVENTOR(S) : Carlo P. Croce, Sami A. Halaby, Arthur R. Oefinger

It is certified that error appears in the above-identified patent and that said Letters Patent is hereby corrected as shown below:

It is noted that errors appear in this patent of a printing nature. The errors occur as follows:

Claim 5, Column 24, line 67: Delete the letter "r" in "computer" and insert the letter "d" to form "computed".

Claim 12, Column 26, line 40: Delete "said" and insert "a" before "second discrete data sequence," after same insert "respectively; and
    means for computing a correlation estimate from said first discrete data sequence and said second discrete data sequence," before "so as to provide"...

Claim 14, Column 26 (Formula): Delete bar (-) over $x_i$ and insert bar (-) over x.

On line 63: Insert bar over X and Y (-) where it states "$\bar{x}$ and $\bar{y}$ represent the mean value"

Claim 15, Column 27, (Formula): Error on lower half where "$x_k^2$" should be --$x_k^2$-- and "$y_k^2$" should be --$y_k^2$--.

Claim 25, Column 29, line 14-15 (Formula): Insert bar (-) over $(Y_i - \bar{Y})$ Claim 26, Column 29, line 45: Delete "said" before "instantaneous value of".

Claim 29, Column 30, Line 5 (Formula): Insert bar (-) over X in $(x_i - \bar{x})$ and insert bar (-) over y in $Y_i - \bar{y})^2$.

UNITED STATES PATENT AND TRADEMARK OFFICE
CERTIFICATE OF CORRECTION

PATENT NO. : 4,771,630

DATED : September 20, 1988

INVENTOR(S) : Carlo P. Croce, et. al

It is certified that error appears in the above-identified patent and that said Letters Patent is hereby corrected as shown below:

-2-

Claim 30, Column 30 (Formula): Correct as follows:

where formula shows "$x_k 2$" should be --$x_k^2$-- and "$y_k 2$" should be --$y_k^2$--.

Claim 35, Column 31 (Formula): Correct as follows:

where formula shows "$x_k 2$" should be --$x_k^2$-- and "$y_k 2$" should be --$y_k^2$--.

Claim 37, Column 32, (Formula): Insert bar (-) over x ($x_i - \bar{x}$) and insert bar (-) over y ($y_i - \bar{y}$) and insert bar (-) over x $(x_i - \bar{x})^2$.

Claim 27, Column 29, line 56: "according to claim 26" instead of claim 25.

Signed and Sealed this

Eighteenth Day of April, 1989

*Attest:*

DONALD J. QUIGG

*Attesting Officer*     *Commissioner of Patents and Trademarks*